US011128165B2

(12) United States Patent
McNamara et al.

(10) Patent No.: US 11,128,165 B2
(45) Date of Patent: Sep. 21, 2021

(54) BEHIND-THE-METER CHARGING STATION WITH AVAILABILITY NOTIFICATION

(71) Applicant: Lancium LLC, Houston, TX (US)

(72) Inventors: Michael T. McNamara, Newport Beach, CA (US); David J. Henson, Houston, TX (US); Raymond E. Cline, Jr., Houston, TX (US)

(73) Assignee: LANCIUM LLC, Houston, TX (US)

( * ) Notice: Subject to any disclaimer, the term of this patent is extended or adjusted under 35 U.S.C. 154(b) by 271 days.

(21) Appl. No.: 16/284,610

(22) Filed: Feb. 25, 2019

(65) Prior Publication Data

US 2020/0274388 A1    Aug. 27, 2020

(51) Int. Cl.

| | |
|---|---|
| *H02J 7/00* | (2006.01) |
| *H02J 13/00* | (2006.01) |
| *B60L 53/30* | (2019.01) |
| *H02J 3/38* | (2006.01) |
| *B60L 53/51* | (2019.01) |
| *B60L 53/52* | (2019.01) |

(52) U.S. Cl.
CPC ........ *H02J 13/0006* (2013.01); *B60L 53/305* (2019.02); *B60L 53/51* (2019.02); *B60L 53/52* (2019.02); *H02J 3/383* (2013.01); *H02J 3/386* (2013.01); *B60L 2210/20* (2013.01)

(58) Field of Classification Search
None
See application file for complete search history.

(56) References Cited

U.S. PATENT DOCUMENTS

| | | |
|---|---|---|
| 5,142,672 A | 8/1992 | Johnson et al. |
| 5,367,669 A | 11/1994 | Holland et al. |
| 5,913,046 A | 6/1999 | Barth et al. |
| 6,288,456 B1 | 9/2001 | Cratty |
| 6,633,823 B2 | 10/2003 | Bartone et al. |
| 7,143,300 B2 | 11/2006 | Potter et al. |
| 7,376,851 B2 | 5/2008 | Kim |
| 7,647,516 B2 | 1/2010 | Ranganathan et al. |
| 7,702,931 B2 | 4/2010 | Goodrum et al. |

(Continued)

FOREIGN PATENT DOCUMENTS

| | | |
|---|---|---|
| CN | 103163904 A | 6/2013 |
| KR | 20090012523 A | 2/2009 |

(Continued)

OTHER PUBLICATIONS

Advisory Action dated Nov. 13, 2020 for U.S. Appl. No. 16/529,360, filed Aug. 1, 2019, 182 pages.

(Continued)

*Primary Examiner* — Arun C Williams
(74) *Attorney, Agent, or Firm* — Barnes & Thornburg LLP

(57) ABSTRACT

A system includes a behind-the-meter vehicle charging station. The vehicle charging station includes a vehicle-charging interface configured to supply the vehicle-charging power to a vehicle. The vehicle charging station further includes a communication unit configured to trigger a notification in response to a change in power availability. Additionally, the system includes a control system configured to modulate power delivery to the behind-the-meter charging station based on one or more monitored power system conditions or an operational directive.

20 Claims, 18 Drawing Sheets

(56) References Cited

U.S. PATENT DOCUMENTS

| | | |
|---|---|---|
| 7,779,276 B2 | 8/2010 | Bolan et al. |
| 7,861,102 B1 | 12/2010 | Ranganathan et al. |
| 7,921,315 B2 | 4/2011 | Langgood et al. |
| 7,970,561 B2 | 6/2011 | Pfeiffer |
| 8,001,403 B2 | 8/2011 | Hamilton et al. |
| 8,006,108 B2 | 8/2011 | Brey et al. |
| 8,214,843 B2 | 7/2012 | Boss et al. |
| 8,260,913 B2 | 9/2012 | Knapp et al. |
| 8,374,928 B2 | 2/2013 | Gopisetty et al. |
| 8,447,993 B2 | 5/2013 | Greene et al. |
| 8,571,820 B2 | 10/2013 | Pfeiffer |
| 8,627,123 B2 | 1/2014 | Jain et al. |
| 8,639,392 B2 | 1/2014 | Chassin |
| 8,700,929 B1 | 4/2014 | Weber et al. |
| 8,706,915 B2 | 4/2014 | Duchesneau |
| 8,719,223 B2 | 5/2014 | Knapp et al. |
| 8,789,061 B2 | 7/2014 | Pavel et al. |
| 8,799,690 B2 | 8/2014 | Dawson et al. |
| 9,003,211 B2 | 4/2015 | Pfeiffer |
| 9,003,216 B2 | 4/2015 | Sankar et al. |
| 9,026,814 B2 | 5/2015 | Aasheim et al. |
| 9,027,024 B2 | 5/2015 | Mick et al. |
| 9,143,392 B2 | 9/2015 | Duchesneau |
| 9,207,993 B2 | 12/2015 | Jain |
| 9,218,035 B2 | 12/2015 | Li et al. |
| 9,282,022 B2 | 3/2016 | Matthews et al. |
| 9,542,231 B2 | 1/2017 | Khan et al. |
| 9,552,234 B2 | 1/2017 | Boldyrev et al. |
| 9,645,596 B1 | 5/2017 | Lee et al. |
| 9,994,118 B2* | 6/2018 | Williams ............... B60L 58/12 |
| 10,367,353 B1 | 7/2019 | Mcnamara |
| 10,367,535 B2 | 7/2019 | Corse et al. |
| 10,444,818 B1 | 10/2019 | McNamara et al. |
| 10,452,127 B1 | 10/2019 | McNamara et al. |
| 10,452,532 B2 | 10/2019 | McVay et al. |
| 10,497,072 B2 | 12/2019 | Hooshmand et al. |
| 10,608,433 B1 | 3/2020 | McNamara et al. |
| 10,618,427 B1 | 4/2020 | McNamara et al. |
| 10,637,353 B2 | 4/2020 | Ohyama et al. |
| 2002/0072868 A1 | 6/2002 | Bartone et al. |
| 2002/0158749 A1* | 10/2002 | Ikeda ............... B60L 53/305 340/5.74 |
| 2003/0023885 A1 | 1/2003 | Potter et al. |
| 2003/0074464 A1 | 4/2003 | Bohrer et al. |
| 2004/0117330 A1 | 6/2004 | Ehlers et al. |
| 2005/0203761 A1 | 9/2005 | Barr et al. |
| 2006/0161765 A1 | 7/2006 | Cromer et al. |
| 2008/0030078 A1 | 2/2008 | Whitted et al. |
| 2008/0094797 A1 | 4/2008 | Coglitore et al. |
| 2009/0055665 A1 | 2/2009 | Maglione et al. |
| 2009/0070611 A1 | 3/2009 | Bower, III et al. |
| 2009/0078401 A1 | 3/2009 | Cichanowicz |
| 2009/0089595 A1 | 4/2009 | Brey et al. |
| 2009/0216910 A1 | 8/2009 | Duchesneau |
| 2010/0211810 A1 | 8/2010 | Zacho |
| 2010/0235004 A1 | 9/2010 | Thind |
| 2010/0280675 A1* | 11/2010 | Tate, Jr. ............... H01M 10/44 700/295 |
| 2010/0328849 A1 | 12/2010 | Ewing et al. |
| 2011/0072289 A1 | 3/2011 | Kato |
| 2011/0238342 A1 | 9/2011 | Pfeiffer |
| 2012/0000121 A1 | 1/2012 | Swann |
| 2012/0072745 A1 | 3/2012 | Ahluwalia et al. |
| 2012/0300524 A1 | 11/2012 | Fornage et al. |
| 2012/0306271 A1 | 12/2012 | Kuriyama |
| 2012/0324259 A1 | 12/2012 | Aasheim et al. |
| 2013/0006401 A1 | 1/2013 | Shan |
| 2013/0063991 A1 | 3/2013 | Xiao et al. |
| 2013/0086404 A1 | 4/2013 | Sankar et al. |
| 2013/0117621 A1 | 5/2013 | Saraiya et al. |
| 2013/0187464 A1 | 7/2013 | Smith et al. |
| 2013/0227139 A1 | 8/2013 | Suffling |
| 2013/0304903 A1 | 11/2013 | Mick et al. |
| 2013/0306276 A1 | 11/2013 | Duchesneau |
| 2014/0070756 A1 | 3/2014 | Kearns et al. |
| 2014/0137468 A1 | 5/2014 | Ching |
| 2014/0180886 A1 | 6/2014 | Forbes, Jr. |
| 2014/0379156 A1 | 12/2014 | Kamel et al. |
| 2015/0012113 A1 | 1/2015 | Celebi |
| 2015/0121113 A1 | 4/2015 | Ramamurthy et al. |
| 2015/0155712 A1 | 6/2015 | Mondal |
| 2015/0212122 A1 | 7/2015 | Sobotka et al. |
| 2015/0229227 A1 | 8/2015 | Aeloiza et al. |
| 2015/0277410 A1 | 10/2015 | Gupta et al. |
| 2015/0278968 A1 | 10/2015 | Steven et al. |
| 2015/0288183 A1 | 10/2015 | Villanueva, Jr. et al. |
| 2015/0372538 A1 | 12/2015 | Siegler et al. |
| 2016/0006066 A1 | 1/2016 | Robertson |
| 2016/0011617 A1 | 1/2016 | Liu et al. |
| 2016/0043552 A1 | 2/2016 | Villanueva, Jr. et al. |
| 2016/0126783 A1 | 5/2016 | Cheng et al. |
| 2016/0170469 A1 | 6/2016 | Sehgal et al. |
| 2016/0172900 A1 | 6/2016 | Welch, Jr. |
| 2016/0187906 A1 | 6/2016 | Bodas et al. |
| 2016/0198656 A1 | 7/2016 | McNamara et al. |
| 2016/0212954 A1 | 7/2016 | Argento |
| 2016/0248631 A1 | 8/2016 | Duchesneau |
| 2016/0324077 A1 | 11/2016 | Frantzen et al. |
| 2017/0023969 A1 | 1/2017 | Shows et al. |
| 2017/0104336 A1 | 4/2017 | Elbsat et al. |
| 2017/0261949 A1 | 9/2017 | Hoffmann et al. |
| 2017/0373500 A1 | 12/2017 | Shafi et al. |
| 2018/0026478 A1 | 1/2018 | Peloso |
| 2018/0144414 A1 | 5/2018 | Lee et al. |
| 2018/0202825 A1 | 7/2018 | You et al. |
| 2018/0240112 A1 | 8/2018 | Castinado et al. |
| 2018/0366978 A1 | 12/2018 | Matan et al. |
| 2018/0367320 A1 | 12/2018 | Montalvo |
| 2019/0052094 A1 | 2/2019 | Pmsvvsv et al. |
| 2019/0168630 A1 | 6/2019 | Mrlik et al. |
| 2019/0258307 A1 | 8/2019 | Shaikh et al. |
| 2019/0280521 A1 | 9/2019 | Lundstrom et al. |
| 2019/0318327 A1 | 10/2019 | Sowell et al. |
| 2019/0324820 A1 | 10/2019 | Krishnan et al. |
| 2020/0040272 A1 | 2/2020 | Cavness et al. |
| 2020/0051184 A1 | 2/2020 | Barbour |
| 2020/0073466 A1 | 3/2020 | Walsh |
| 2020/0136387 A1 | 4/2020 | McNamara et al. |
| 2020/0136388 A1 | 4/2020 | McNamara et al. |

FOREIGN PATENT DOCUMENTS

| | | |
|---|---|---|
| WO | 2015199629 A1 | 12/2015 |
| WO | WO-2019116375 A1 | 6/2019 |
| WO | WO-2019139633 A1 | 7/2019 |

OTHER PUBLICATIONS

Advisory Action dated Oct. 22, 2020 for U.S. Appl. No. 16/528,348, filed Jul. 31, 2019, 3 pages.

Bakar.N. et al., "Microgrid and Load Shedding Scheme During Islanded Mode: a Review," Elsevier, May 26, 2020, vol. 71, pp. 161-169. https://www.sciencedirect.com/science/article/pii/S1364032116311030.

Choi.Y et al., "Optimal Load Shedding for Maximizing Satisfaction in an Islanded Microgrid," Energies, 2017, vol. 10, pp. 45. doi: 10.3390/en10010045.

Final Office Action dated Jul. 23, 2020 on for U.S. Appl. No. 16/132,062, filed Sep. 14, 2018, 26 pages.

Final Office Action dated May 19, 2020 for U.S. Appl. No. 16/809,111, filed Mar. 4, 2020, 36 pages.

Final Office Action dated Jun. 3, 2020 for U.S. Appl. No. 16/528,348, filed Jul. 31, 2019, 33 pages.

Final Office Action dated May 28, 2020 for U.S. Appl. No. 16/132,098, filed Sep. 14, 2018, 24 pages.

Final Office Action dated Jul. 29, 2020 for U.S. Appl. No. 16/132,092, filed Sep. 14, 2018, 5 pages.

Gao.H et al., "Dynamic Load Shedding for an Islanded Microgrid With Limited Generation Resources," IET Generation, Transmission & Distribution, Sep. 2016, vol. 10(12), pp. 2953-2961. doi: 10.1049/iet-gtd.2015.1452.

(56) References Cited

OTHER PUBLICATIONS

International Search Report and Written Opinion of PCT Application No. PCT/US2020/044536, dated Aug. 26, 2020, 24 pages.
International Search Report and Written Opinion of PCT Application No. PCT/US2020/044539, dated Aug. 26, 2020, 7 pages.
John, "Stem and CPower to Combine Behind-the-Meter Batteries and Demand Response," Energy Storage, Aug. 8, 2017, 1 page.
Lim.Y et al., "Distributed Load-shedding System for Agent-based Autonomous Microgrid Operations," Energies, 2014, vol. 7(1), pp. 385-401. doi: 10.3390/en7010385.
Liu.W et al., "Improved Average Consensus Algorithm Based Distributed Cost Optimization for Loading Shedding of Autonomous Microgrids,"International Journal of Electrical Power & Energy Systems, Dec. 2015, vol. 73, pp. 89-96. doi: 10.1016/j.ijepes.2015.04.006.
Mousavizadeh.S et al., "A Linear Two-stage Method for Resiliency Analysis in Distribution Systems Considering Renewable Energy and Demand Response Resources," Elsevier, 2017, pp. 443-460. doi: 10.1016/j.apenergy.2017.11.067.
Non-Final Office Action dated Jun. 12, 2020 for U.S. Appl. No. 16/803,109, filed Dec. 27, 2020, 31 pages.
Non-Final Office Action dated May 14, 2020 on for U.S. Appl. No. 16/834,987, filed Mar. 30, 2020, 30 pages.
Notice of Allowance dated Oct. 13, 2020 on for U.S. Appl. No. 16/132,098, filed Sep. 14, 2018, 5 pages.
Notice of Allowance dated Jun. 12, 2020 on for U.S. Appl. No. 16/834,987, filed Mar. 30, 2020, 9 pages.
Notice of Allowance dated Sep. 17, 2020 on for U.S. Appl. No. 16/175,246, filed Oct. 30, 2018, 5 pages.
Notice of Allowance dated Nov. 19, 2020 on for U.S. Appl. No. 16/132,062, filed Sep. 14, 2018, 7 pages.
Notice of Allowance dated Jul. 29, 2020 on for U.S. Appl. No. 16/132,011, filed Sep. 14, 2018, 5 pages.
Notice of Allowance dated Oct. 29, 2020 on for U.S. Appl. No. 16/132,092, filed Sep. 14, 2018, 8 pages.
Pashajavid.E et al., "A Multimode Supervisory Control Scheme for Coupling Remote Droop-Regulated Microgrids," IEEE Transactions on Smart Grid, May 26, 2020, vol. 9(5), pp. 5381-5392. https://ieeexplore.ieee.org/abstract/document/7888570/.
Pashajavid.E et al., "Frequency Support for Remote Microgrid Systems With Intermittent Distributed Energy Resources—A Two-level Hierarchical Strategy," IEEE Systems Journal, May 26, 2020, vol. 12(3), pp. 2760-2771. https://ieeexplore.ieee.org/abstract/document/7862156/.
Rudez.U and Mihalic.R, "Predictive Underfrequency Load Shedding Scheme for Islanded Power Systems With Renewable Generation," Electric Power Systems Research, May 2015, vol. 126, pp. 21-28. doi: 10.1016/j.epsr.2015.04.017.
Wilson, Joseph Nathanael, "A Utility-Scale Deployment Project of Behind-the-Meter Energy Storage for Use in Ancillary Services, Energy Resiliency, Grid Infrastructure Investment Deferment, and Demand-Response Integration," Portland State University, 2016, 154 pages.
Xu.Q et al., "Distributed Load Shedding for Microgrid With Compensation Support via Wireless Network," IET Generation, Transmission & Distribution, May 2018, vol. 12(9), pp. 2006-2018. doi: 10.1049/iet-gtd.2017.1029.
Zhou.Q et al., "Two-Stage Load Shedding for Secondary Control in Hierarchical Operation of Islanded Microgrids," IEEE Transactions on Smart Grid, May 2019, vol. 10(3), pp. 3103-3111. doi: 10.1109/TSG.2018.2817738.
Co-pending U.S. Appl. No. 16/132,092, filed Sep. 14, 2018.
Co-pending U.S. Appl. No. 16/175,246, filed Oct. 30, 2018.
Co-pending U.S. Appl. No. 16/482,495, filed Jul. 31, 2019.
Notice of Allowance dated Jan. 27, 2020, for U.S. Appl. No. 16/702,931, filed Dec. 4, 2019, 23 pages.
Final Office Action dated Apr. 17, 2020 for U.S. Appl. No. 16/529,402, filed Aug. 1, 2019, 59 pages.
Hayes, Adam S., "A Cost of Production Model for Bitcoin," Department of Economics, The New School for Social Research, Mar. 2015, 5 pages.
Non-Final Office Action dated Feb. 20, 2020 for U.S. Appl. No. 16/702,894, filed Dec. 4, 2019, 30 pages.
Non-Final Office Action dated Apr. 2, 2020 on for U.S. Appl. No. 16/132,011, filed Sep. 14, 2018, 5 pages.
Non-Final Office Action dated Mar. 30, 2020 for U.S. Appl. No. 16/132,092, filed Sep. 14, 2018, 46 pages.
Notice of Allowance dated Mar. 2, 2020, for U.S. Appl. No. 16/596,190, filed Oct. 8, 2019, 15 pages.
Notice of Allowance dated Apr. 6, 2020, for U.S. Appl. No. 16/175,246, filed Oct. 30, 2018, 12 pages.
Bird L., et al., "Wind and Solar Energy Curtailment: Experience and Practices in the United States," National Renewable Energy Lab (NREL), Technical Report NREL/TP-6A20-60983, Mar. 2014, 58 pages.
EPEX Spot, "How They Occur, What They Mean," https://www.epexspot.com/en/company-info/basics_of_the_power_market/negative_prices, 2018, 2 pages.
International Search Report and Written Opinion of PCT Application No. PCT/US2018/017955, dated Apr. 30, 2018, 22 pages.
International Search Report and Written Opinion of PCT Application No. PCT/US2018/017950, dated May 31, 2018, 15 pages.
Notice of Allowance dated Jul. 29, 2019, for U.S. Appl. No. 16/245,532, filed Jan. 11, 2019, 13 pages.
Soluna., "Powering the Block Chain," Aug. 2018, version 1.1, 29 pages.
Notice of Allowance dated Apr. 2, 2019, for U.S. Appl. No. 16/175,335, filed Oct. 30, 2018, 12 pages.
Ghamkhari et al., "Optimal Integration of Renewable Energy Resources in Data Centers with Behind-the-Meter Renewable Generator," Department of Electrical and Computer Engineering Texas Tech University, 2012, pp. 3340-3444.
Non-Final Office Action dated Dec. 5, 2019 for U.S. Appl. No. 16/529,360, filed Aug. 1, 2019, 72 pages.
Non-Final Office Action dated Dec. 10, 2019 for U.S. Appl. No. 16/596,190, filed Oct. 8, 2019, 72 pages.
Non-Final Office Action dated Nov. 14, 2019 for U.S. Appl. No. 16/132,098, filed Sep. 14, 2018, 25 pages.
Non-Final Office Action dated Nov. 21, 2019 for U.S. Appl. No. 16/529,402, filed Aug. 1, 2019, 57 pages.
Non-Final Office Action dated Dec. 11, 2019 on for U.S. Appl. No. 16/132,062, filed Sep. 14, 2018, 17 pages.
Non-Final Office Action dated Dec. 10, 2019 for U.S. Appl. No. 16/528,348, filed Oct. 8, 2019, 33 pages.
Rahimi, Farrokh, "Using a Transactive Energy Framework," IEEE Electrification Magazine, Dec. 2016, pp. 23-29.
Final Office Action dated Oct. 1, 2019 for U.S. Appl. No. 16/175,246, filed Oct. 30, 2018, 18 pages.
Notice of Allowance dated Aug. 15, 2019, for U.S. Appl. No. 16/175,146, filed Oct. 30, 2018, 17 pages.
Wilson, J., "A Utility-Scale Deployment Project of Behind-the-Meter Energy Storage for Use in Ancillary Services, Energy Resiliency, Grid Infrastructure Investment Deferment, and Demand-Response Integration," Portland State University, 2016.
International Search Report and Written Opinion of PCT Application No. PCT/US20/57686, dated Feb. 22, 2021, 67 pages.
ISO, "Distributed Energy Resources Roadmap for New York's Wholesale Electricity Markets," Distributed Energy Resource Roadmap, Jan. 2017, pp. 1-39. [retrieved on Dec. 15, 2020], Retrieved from the Internet:< url:< a=""href="https://www.nyiso.com/documents/20142/1391862/Distributed_Energy_Resources_Road_map.pdf/ec0b3b64-4de2-73e0-ffef-49a4b8b1">https://www.nyiso.com/documents/20142/1391862/Distributed_Energy_Resources_Roadmap.pdf/ec0b3b64-4de2-73e0-ffef-49a4b8b1 b3ca.</url:>.
Non-Final Office Action dated Mar. 8, 2021 on for U.S. Appl. No. 16/525,142, filed Jul. 29, 2019, 71 pages.
Non-Final Office Action dated Feb. 12, 2021 on for U.S. Appl. No. 16/528,348, filed Jul. 31, 2019, 54 pages.
Non-Final Office Action dated Mar. 25, 2021 on for U.S. Appl. No. 16/573,577, filed Sep. 17, 2019, 65 pages.

(56) References Cited

OTHER PUBLICATIONS

Notice of Allowance dated Feb. 8, 2021 on for U.S. Appl. No. 16/132,062, filed Sep. 14, 2018, 21 pages.
Notice of Allowance dated Feb. 8, 2021 on for U.S. Appl. No. 16/803,109, filed Feb. 27, 2020, 29 pages.
Notice of Allowance dated Feb. 8, 2021 on for U.S. Appl. No. 16/834,987, filed Mar. 30, 2020, 180 pages.
Notice of Allowance dated Jan. 13, 2021 on for U.S. Appl. No. 16/175,246, filed Oct. 30, 2018, 5 pages.
Notice of Allowance dated Jan. 25, 2021 on for U.S. Appl. No. 16/132,098, filed Sep. 14, 2018, 5 pages.
Notice of Allowance dated Jan. 25, 2021 on for U.S. Appl. No. 16/702,894, filed Dec. 4, 2019, 24 pages.
Notice of Allowance dated Jan. 27, 2021 on for U.S. Appl. No. 16/132,092, filed Sep. 14, 2018, 8 pages.
International Search Report and Written Opinion of PCT Application No. PCT/US2021/019875, dated Apr. 29, 2021, 12 pages.
Kewl, "Start-Up From the Heart of Berlin Has Pioneered Decentralized Mobile Mining by Combining Blockchain With Regenerative Energy" Nov. 2017, 3 pages pdf http://www.crypto-news.net/start-up-from-the-heart-of-berlin-has-pioneered-decentralized-mobile-mining-by-combining-blockchain-with-regenerative-energy/ (Year: 2017).
Final Office Action dated Jul. 9, 2021 on for U.S. Appl. No. 16/525,142, filed Jul. 29, 2019, 18 pages.
Non-Final Office Action dated May 11, 2021 for U.S. Appl. No. 16/529,360, filed Aug. 1, 2019, 64 pages.
Non-Final Office Action dated May 28, 2021 for U.S. Appl. No. 16/658,983, filed Oct. 21, 2019, 21 pages.
Notice of Allowance dated May 12, 2021 on for U.S. Appl. No. 16/132,062, filed Sep. 14, 2018, 2 pages.
Notice of Allowance dated Apr. 20, 2021 on for U.S. Appl. No. 16/482,495, filed Jul. 31, 2019, 5 pages.
Notice of Allowance dated Jun. 9, 2021 in U.S. Appl. No. 16/528,348, filed Jul. 31, 2019.

\* cited by examiner

BEHIND-THE-METER CHARGING STATION WITH AVAILABILITY NOTIFICATION

FIELD OF THE INVENTION

This specification relates to a system for controlling the use of "behind-the-meter" power.

BACKGROUND OF THE INVENTION

The price for power distributed through regional and national electric power grids is composed of Generation, Administration, and Transmission & Distribution ("T&D") costs. T&D costs are a significant portion of the overall price paid by consumers for electricity. T&D costs include capital costs (land, equipment, substations, wire, etc.), electrical transmission losses, and operation and maintenance costs. Electrical power is typically generated at local stations (e.g., coal, natural gas, nuclear, and renewable sources) in the Medium Voltage class of 2.4 kVAC to 69 kVAC before being converted in an AC-AC step up transformer to High Voltage at 115 kVAC or above. T&D costs are accrued at the point the generated power leaves the local station and is converted to High Voltage electricity for transmission onto the grid.

Local station operators are paid a variable market price for the amount of power leaving the local station and entering the grid. However, grid stability requires that a balance exist between the amount of power entering the grid and the amount of power used from the grid. Grid stability and congestion is the responsibility of the grid operator and grid operators take steps, including curtailment, to reduce power supply from local stations when necessary. Frequently, the market price paid for generated power will be decreased in order to disincentivize local stations from generating power. In some cases, the market price will go negative, resulting in a cost to local station operators who continue to supply power onto a grid. Grid operators may sometimes explicitly direct a local station operator to reduce or stop the amount of power the local station is supplying to the grid.

Power market fluctuations, power system conditions such as power factor fluctuation or local station startup and testing, and operational directives resulting in reduced or discontinued generation all can have disparate effects on renewable energy generators and can occur multiple times in a day and last for indeterminate periods of time. Curtailment, in particular, is particularly problematic.

According to the National Renewable Energy Laboratory's Technical Report TP-6A20-60983 (March 2014):

[C]urtailment [is] a reduction in the output of a generator from what it could otherwise produce given available resources (e.g., wind or sunlight), typically on an involuntary basis. Curtailments can result when operators or utilities command wind and solar generators to reduce output to minimize transmission congestion or otherwise manage the system or achieve the optimal mix of resources. Curtailment of wind and solar resources typically occurs because of transmission congestion or lack of transmission access, but it can also occur for reasons such as excess generation during low load periods that could cause baseload generators to reach minimum generation thresholds, because of voltage or interconnection issues, or to maintain frequency requirements, particularly for small, isolated grids. Curtailment is one among many tools to maintain system energy balance, which can also include grid capacity, hydropower and thermal generation, demand response, storage, and institutional changes. Deciding which method to use is primarily a matter of economics and operational practice.

"Curtailment" today does not necessarily mean what it did in the early 2000s. Two sea changes in the electric sector have shaped curtailment practices since that time: the utility-scale deployment of wind power, which has no fuel cost, and the evolution of wholesale power markets. These simultaneous changes have led to new operational challenges but have also expanded the array of market-based tools for addressing them.

Practices vary significantly by region and market design. In places with centrally-organized wholesale power markets and experience with wind power, manual wind energy curtailment processes are increasingly being replaced by transparent offer-based market mechanisms that base dispatch on economics. Market protocols that dispatch generation based on economics can also result in renewable energy plants generating less than what they could potentially produce with available wind or sunlight. This is often referred to by grid operators by other terms, such as "downward dispatch." In places served primarily by vertically integrated utilities, power purchase agreements (PPAs) between the utility and the wind developer increasingly contain financial provisions for curtailment contingencies.

Some reductions in output are determined by how a wind operator values dispatch versus non-dispatch. Other curtailments of wind are determined by the grid operator in response to potential reliability events. Still other curtailments result from overdevelopment of wind power in transmission-constrained areas.

Dispatch below maximum output (curtailment) can be more of an issue for wind and solar generators than it is for fossil generation units because of differences in their cost structures. The economics of wind and solar generation depend on the ability to generate electricity whenever there is sufficient sunlight or wind to power their facilities. Because wind and solar generators have substantial capital costs but no fuel costs (i.e., minimal variable costs), maximizing output improves their ability to recover capital costs. In contrast, fossil generators have higher variable costs, such as fuel costs. Avoiding these costs can, depending on the economics of a specific generator, to some degree reduce the financial impact of curtailment, especially if the generator's capital costs are included in a utility's rate base.

Curtailment may result in available energy being wasted (which may not be true to the same extent for fossil generation units which can simply reduce the amount of fuel that is being used). With wind generation, in particular, it may also take some time for a wind farm to become fully operational following curtailment. As such, until the time that the wind farm is fully operational, the wind farm may not be operating with optimum efficiency and/or may not be able to provide power to the grid.

BRIEF SUMMARY OF THE INVENTION

In one embodiment, a system includes a behind-the-meter vehicle charging station. The vehicle charging station includes a vehicle-charging interface configured to supply the vehicle-charging power to a vehicle. The vehicle charging station further includes a communication unit configured to trigger a notification in response to a change in power availability. Additionally, the system includes a control system configured to modulate power delivery to the behindthe-meter charging station based on one or more monitored power system conditions or an operational directive.

In another embodiment, a method includes determining that a flexible datacenter ramp-up condition is me. Based on the determination that the flexible datacenter ramp-up condition is met, the method includes enabling behind-the-meter power delivery from the one or more selected behind-the-meter energy sources to the one or more vehicle charging stations. Additionally, based on the determination that the flexible datacenter ramp-up condition is met, the method includes triggering a notification from a communication unit of the one or more vehicle charging stations.

Other aspects of the present invention will be apparent from the following description and claims

DETAILED DESCRIPTION OF THE INVENTION

Figure 1:
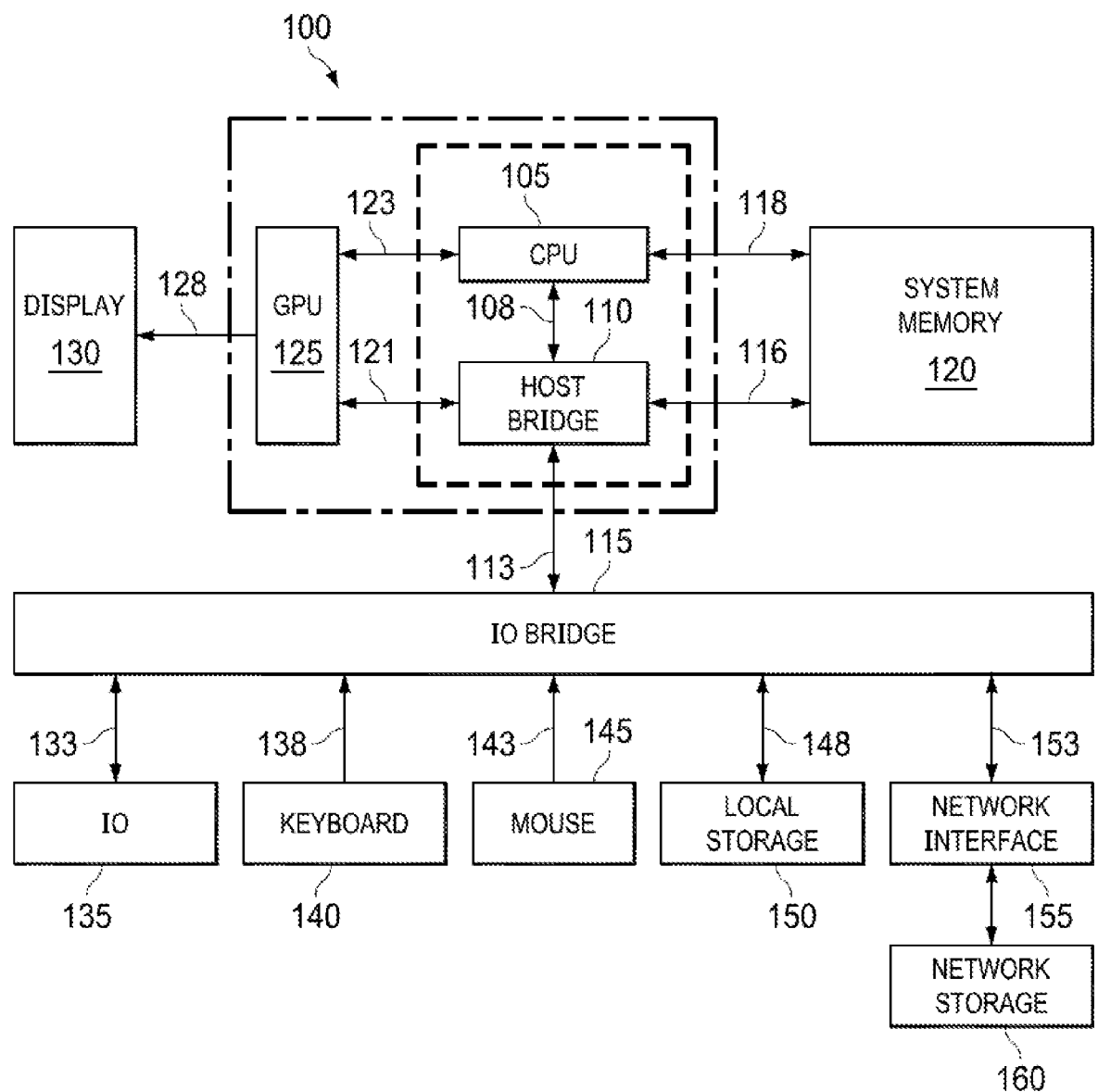
FIG. 1 shows a computing system in accordance with one or more embodiments of the present invention.

One or more embodiments of the present invention are described in detail with reference to the accompanying figures. For consistency, like elements in the various figures are denoted by like reference numerals. In the following detailed description of the present invention, specific details are set forth in order to provide a thorough understanding of the present invention. In other instances, well-known features to one having ordinary skill in the art are not described to avoid obscuring the description of the present invention.

The embodiments provided herein relate to providing an electrical load "behind the meter" at local stations such that generated power can be directed to the behind-the-meter load instead of onto the grid, typically for intermittent periods of time. "Behind-the-meter" power includes power that is received from a power generation system (for instance, but not limited to, a wind or solar power generation system) prior to the power undergoing step-up transformation to High Voltage class AC power for transmission to the grid. Behind-the-meter power may therefore include power drawn directly from an intermittent grid-scale power generation system (e.g. a wind farm or a solar array) and not from the grid.

The embodiments herein provide an advantage when, for example, the power system conditions exhibit excess local power generation at a local station level, excess local power generation that a grid cannot receive, local power generation that is subject to economic curtailment, local power generation that is subject to reliability curtailment, local power generation that is subject to power factor correction, low local power generation, start up local power generation situations, transient local power generation situations, conditions where the cost for power is economically viable (e.g., low cost for power), or testing local power generation situations where there is an economic advantage to using local behind-the-meter power generation. This is not least because the excess power can be utilized by the behind-the-meter electrical load rather than going to waste. In addition, by providing an electrical load behind-the-meter rather than connected to the grid, electrical transmission losses resulting from transmission of power through the grid can be reduced. In addition, any degradation in the power generation systems which may result from curtailment may be reduced.

Preferably, controlled computing systems that consume electrical power through computational operations can provide a behind-the-meter electrical load that can be granularly ramped up and down quickly under the supervision of control systems that monitor power system conditions and direct the power state and/or computational activity of the computing systems. In one embodiment, the computing systems preferably receive all their power for computational operations from a behind-the-meter power source. In another embodiment, the computing systems may additionally include a connection to grid power for supervisory and communication systems or other ancillary needs. In yet another embodiment, the computing systems can be configured to switch between behind-the-meter power and grid power under the direction of a control system.

In a further embodiment, a charging station for electric vehicles as a behind-the-meter electrical load may be included in addition to or instead of a behind-the-meter controlled computing system. Based on the availability of behind-the-grid power, the charging station may be able to, and used to, supply power to electric vehicles. In some instances, power may be supplied to the charging station from either an energy storage device, such as a battery, or from the power generation unit. Additionally, in some examples, the system may include both the charging station and the computing system load. Power may be dynamically routed to both the charging station and the computing system load based on power market conditions and/or power demands of the charging station and the computing system load.

Among other benefits, a charging station alone or in conjunction with a computing system load can provide controlled granular load ramping that allows a local station to avoid negative power market pricing and to respond quickly to grid directives.

Various computing systems can provide granular behind-the-meter ramping. Preferably the computing systems perform computational tasks that are immune to, or not substantially hindered by, frequent interruptions or slow-downs in processing as the computing systems ramp up and down. In one embodiment, control systems can activate or de-activate one or more computing systems in an array of similar or identical computing systems sited behind the meter. For example, one or more blockchain miners, or groups of blockchain miners, in an array may be turned on or off. In another embodiment, control systems can direct time-insensitive computational tasks to computational hardware, such as CPUs and GPUs, sited behind the meter, while other hardware is sited in front of the meter and possibly remote from the behind-the-meter hardware. Any parallel computing processes, such as Monte Carlo simulations, batch processing of financial transactions, graphics rendering, and oil and gas field simulation models are all good candidates for such interruptible computational operations.

Similarly, and possibly in combination with the computing systems that provide granular behind-the-meter ramping, various charging stations may also provide granular behind-the-meter ramping. In one embodiment, control systems can activate or de-activate one or more charging stations sited behind the meter. For example, one or more charging stations, configured to charge batteries and/or electric vehicles, may be turned on or off. In another embodiment, control systems can direct time-insensitive or less time-sensitive charging tasks, such as recharging batteries, to occur based on an availability or cost of power. In some additional examples, the charging stations may be able to deliver power to electric vehicle based on an availability or cost of power.

In some cases, the local station may generate more power than can be consumed by the computing systems, charging system, or distributed to the grid, or the computing systems and/or charging system may need to continue computational operations or charging operations, respectively, for a limited period of time beyond when a ramp-down condition is met. Therefore, it is advantageous to dynamically route generated power into an energy storage system that can be drawn against later when behind-the-meter power is desired but insufficiently available via generation. Thus, in accordance with one or more embodiments of the present invention, the system and/or method can employ dynamic power routing to selectively route power based on determined current or expect power system conditions.

In one or more embodiments of the present invention, methods and systems for dynamic power delivery to a charging station and/or flexible datacenter use behind-the-meter power sources that includes both generated power and stored behind-the-meter power, each without transmission and distribution costs. A centralized control system may be configured to modulate power delivery to at least a portion of the computing systems and the charging station based on monitored power system conditions or an operational directive. For example, the centralized control system may ramp-up to a full capacity status, ramp-down to an off capacity status, or dynamically reduce power consumption, act a load balancer, or adjust the power factor to both charging stations and computing systems. Each of these activities may be performed using any or all of: behind-the-meter generated power, behind-the-meter stored power, and/or grid power. Advantageously, the charging station may perform charging of batteries at the charging station and/or charging of electric vehicles using clean and renewable energy that would otherwise be wasted.

FIG. 1 shows a computing system 100 in accordance with one or more embodiments of the present invention. Computing system 100 may include one or more central processing units (singular "CPU" or plural "CPUs") 105, host bridge 110, input/output ("IO") bridge 115, graphics processing units (singular "GPU" or plural "GPUs") 125, and/or application-specific integrated circuits (singular "ASIC" or plural "ASICs") (not shown) disposed on one or more printed circuit boards (not shown) that are configured to perform computational operations. Each of the one or more CPUs 105, GPUs 125, or ASICs (not shown) may be a single-core (not independently illustrated) device or a multi-core (not independently illustrated) device. Multi-core devices typically include a plurality of cores (not shown) disposed on the same physical die (not shown) or a plurality of cores (not shown) disposed on multiple die (not shown) that are collectively disposed within the same mechanical package (not shown).

CPU 105 may be a general purpose computational device typically configured to execute software instructions. CPU 105 may include an interface 108 to host bridge 110, an interface 118 to system memory 120, and an interface 123 to one or more IO devices, such as, for example, one or more GPUs 125. GPU 125 may serve as a specialized computational device typically configured to perform graphics functions related to frame buffer manipulation. However, one of ordinary skill in the art will recognize that GPU 125 may be used to perform non-graphics related functions that are computationally intensive. In certain embodiments, GPU 125 may interface 123 directly with CPU 125 (and interface 118 with system memory 120 through CPU 105). In other embodiments, GPU 125 may interface 121 with host bridge 110 (and interface 116 or 118 with system memory 120 through host bridge 110 or CPU 105 depending on the application or design). In still other embodiments, GPU 125 may interface 133 with IO bridge 115 (and interface 116 or 118 with system memory 120 through host bridge 110 or CPU 105 depending on the application or design). The functionality of GPU 125 may be integrated, in whole or in part, with CPU 105.

Host bridge 110 may be an interface device configured to interface between the one or more computational devices and IO bridge 115 and, in some embodiments, system memory 120. Host bridge 110 may include an interface 108 to CPU 105, an interface 113 to IO bridge 115, for embodiments where CPU 105 does not include an interface 118 to system memory 120, an interface 116 to system memory 120, and for embodiments where CPU 105 does not include an integrated GPU 125 or an interface 123 to GPU 125, an interface 121 to GPU 125. The functionality of host bridge 110 may be integrated, in whole or in part, with CPU 105. IO bridge 115 may be an interface device configured to interface between the one or more computational devices and various IO devices (e.g., 140, 145) and IO expansion, or add-on, devices (not independently illustrated). IO bridge 115 may include an interface 113 to host bridge 110, one or more interfaces 133 to one or more IO expansion devices 135, an interface 138 to keyboard 140, an interface 143 to mouse 145, an interface 148 to one or more local storage devices 150, and an interface 153 to one or more network interface devices 155. The functionality of IO bridge 115 may be integrated, in whole or in part, with CPU 105 or host bridge 110. Each local storage device 150, if any, may be a solid-state memory device, a solid-state memory device array, a hard disk drive, a hard disk drive array, or any other non-transitory computer readable medium. Network interface device 155 may provide one or more network interfaces including any network protocol suitable to facilitate networked communications.

Computing system 100 may include one or more network-attached storage devices 160 in addition to, or instead of, one or more local storage devices 150. Each network-attached storage device 160, if any, may be a solid-state memory device, a solid-state memory device array, a hard disk drive, a hard disk drive array, or any other non-transitory computer readable medium. Network-attached storage device 160 may or may not be collocated with computing system 100 and may be accessible to computing system 100 via one or more network interfaces provided by one or more network interface devices 155.

One of ordinary skill in the art will recognize that computing system 100 may be a conventional computing system or an application-specific computing system. In certain embodiments, an application-specific computing system may include one or more ASICs (not shown) that are configured to perform one or more functions, such as hashing, in a more efficient manner. The one or more ASICs (not shown) may interface directly with CPU 105, host bridge 110, or GPU 125 or interface through IO bridge 115. Alternatively, in other embodiments, an application-specific computing system may be reduced to only those components necessary to perform a desired function in an effort to reduce one or more of chip count, printed circuit board footprint, thermal design power, and power consumption. The one or more ASICs (not shown) may be used instead of one or more of CPU 105, host bridge 110, IO bridge 115, or GPU 125. In such systems, the one or more ASICs may incorporate sufficient functionality to perform certain network and computational functions in a minimal footprint with substantially fewer component devices.

As such, one of ordinary skill in the art will recognize that CPU 105, host bridge 110, IO bridge 115, GPU 125, or ASIC (not shown) or a subset, superset, or combination of functions or features thereof, may be integrated, distributed, or excluded, in whole or in part, based on an application, design, or form factor in accordance with one or more embodiments of the present invention. Thus, the description of computing system 100 is merely exemplary and not intended to limit the type, kind, or configuration of component devices that constitute a computing system 100 suitable for performing computing operations in accordance with one or more embodiments of the present invention.

One of ordinary skill in the art will recognize that computing system 100 may be a stand alone, laptop, desktop, server, blade, or rack mountable system and may vary based on an application or design.

Figure 2:
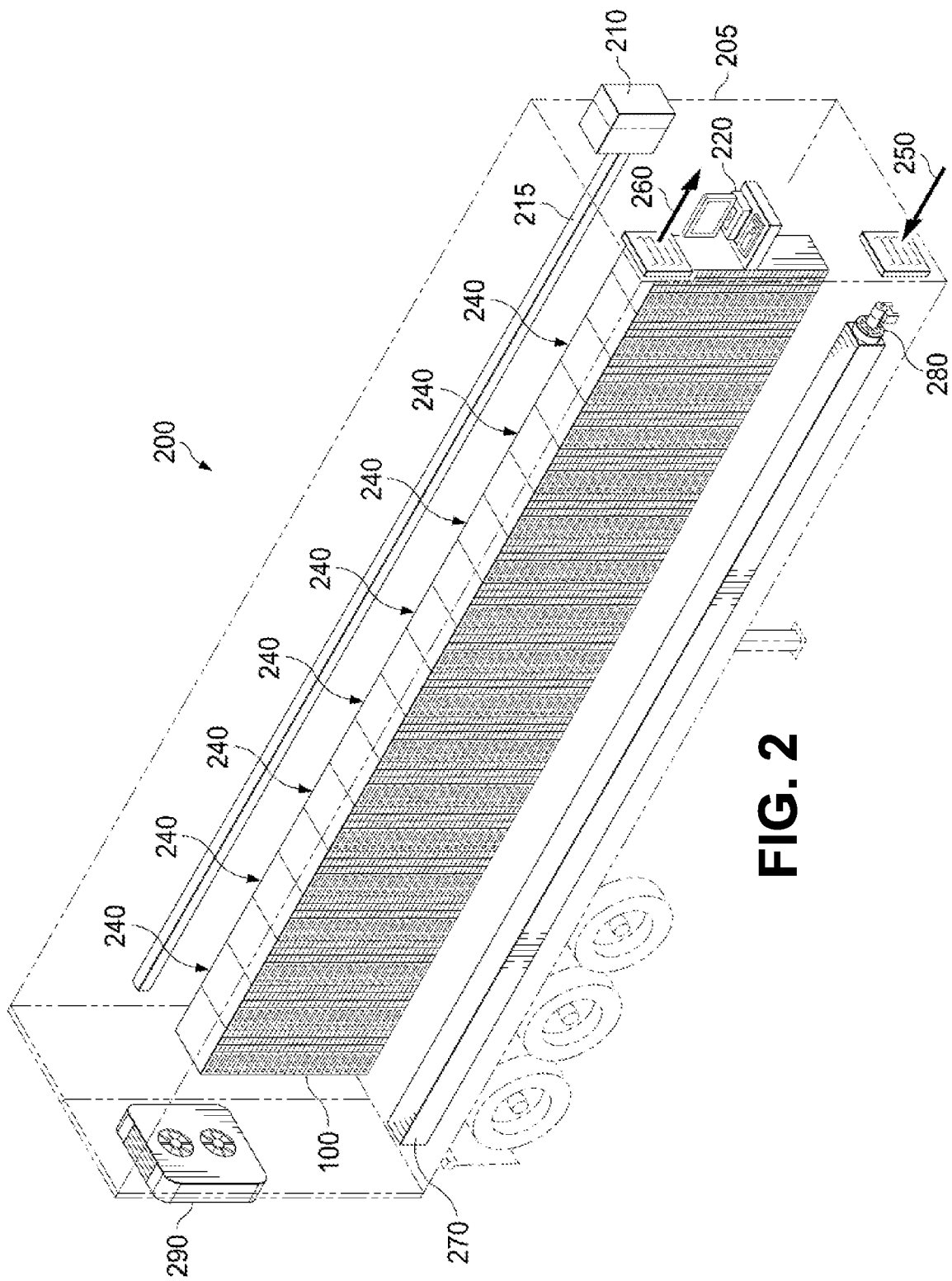
FIG. 2 shows a flexible datacenter in accordance with one or more embodiments of the present invention.

FIG. 2 shows a flexible datacenter 200 in accordance with one or more embodiments of the present invention. Flexible datacenter 200 may include a mobile container 205, a behind-the-meter power input system 210, a power distribution system 215, a climate control system (e.g., 250, 260, 270, 280, and/or 290), a datacenter control system 220, and a plurality of computing systems 100 disposed in one or more racks 240. Datacenter control system 220 may be a computing system (e.g., 100 of FIG. 1) configured to dynamically modulate power delivery to one or more computing systems 100 disposed within flexible datacenter 200 based on behind-the-meter power availability or an operational directive from a local station control system (not shown), a remote master control system (not shown), or a grid operator (not shown).

In certain embodiments, mobile container 205 may be a storage trailer disposed on wheels and configured for rapid deployment. In other embodiments, mobile container 205 may be a storage container (not shown) configured for placement on the ground and potentially stacked in a vertical manner (not shown). In still other embodiments, mobile container 205 may be an inflatable container, a floating container, or any other type or kind of container suitable for housing a mobile datacenter 200. And in still other embodiments, flexible datacenter 200 might not include a mobile container. For example, flexible datacenter 200 may be situated within a building or another type of stationary environment.

Flexible datacenter 200 may be rapidly deployed on site near a source of behind-the-meter power generation. Behind-the-meter power input system 210 may be configured to input power to flexible datacenter 200. Behind-the-meter power input system 210 may include a first input (not independently illustrated) configured to receive three-phase behind-the-meter alternating current ("AC") voltage. In certain embodiments, behind-the-meter power input system 210 may include a supervisory AC-to-AC step-down transformer (not shown) configured to step down three-phase behind-the-meter AC voltage to single-phase supervisory nominal AC voltage or a second input (not independently illustrated) configured to receive single-phase supervisory nominal AC voltage from the local station (not shown) or a metered source (not shown). Behind-the-meter power input system 210 may provide single-phase supervisory nominal AC voltage to datacenter control system 220, which may remain powered at almost all times to control the operation of flexible datacenter 200. The first input (not independently illustrated) or a third input (not independently illustrated) of behind-the-meter power input system 210 may direct three-phase behind-the-meter AC voltage to an operational AC-to-AC step-down transformer (not shown) configured to controllably step down three-phase behind-the-meter AC voltage to three-phase nominal AC voltage. Datacenter control system 220 may controllably enable or disable generation or provision of three-phase nominal AC voltage by the operational AC-to-AC step-down transformer (not shown).

Behind-the-meter power input system 210 may provide three phases of three-phase nominal AC voltage to power distribution system 215. Power distribution system 215 may controllably provide a single phase of three-phase nominal AC voltage to each computing system 100 or group 240 of computing systems 100 disposed within flexible datacenter 200. Datacenter control system 220 may controllably select which phase of three-phase nominal AC voltage that power distribution system 215 provides to each computing system 100 or group 240 of computing systems 100. In this way, datacenter control system 220 may modulate power delivery by either ramping-up flexible datacenter 200 to fully operational status, ramping-down flexible datacenter 200 to offline status (where only datacenter control system 220 remains powered), reducing power consumption by with-drawing power delivery from, or reducing power to, one or more computing systems 100 or groups 240 of computing systems 100, or modulating a power factor correction factor for the local station by controllably adjusting which phases of three-phase nominal AC voltage are used by one or more computing systems 100 or groups 240 of computing systems 100. In some embodiments, flexible datacenter 200 may receive DC power to power computing systems 100.

Flexible datacenter 200 may include a climate control system (e.g., 250, 260, 270, 280, 290) configured to maintain the plurality of computing systems 100 within their operational temperature range. In certain embodiments, the climate control system may include an air intake 250, an evaporative cooling system 270, a fan 280, and an air outtake 260. In other embodiments, the climate control system may include an air intake 250, an air conditioner or refrigerant cooling system 290, and an air outtake 260. In still other embodiments, the climate control system may include a computer room air conditioner system (not shown), a computer room air handler system (not shown), or an immersive cooling system (not shown). One of ordinary skill in the art will recognize that any suitable heat extraction system (not shown) configured to maintain the operation of the plurality of computing systems 100 within their operational temperature range may be used in accordance with one or more embodiments of the present invention.

Flexible datacenter 200 may include a battery system (not shown) configured to convert three-phase nominal AC voltage to nominal DC voltage and store power in a plurality of storage cells. The battery system (not shown) may include a DC-to-AC inverter configured to convert nominal DC voltage to three-phase nominal AC voltage for flexible datacenter 200 use. Alternatively, the battery system (not shown) may include a DC-to-AC inverter configured to convert nominal DC voltage to single-phase nominal AC voltage to power datacenter control system 220.

One of ordinary skill in the art will recognize that a voltage level of three-phase behind-the-meter AC voltage may vary based on an application or design and the type or kind of local power generation. As such, a type, kind, or configuration of the operational AC-to-AC step down transformer (not shown) may vary based on the application or design. In addition, the frequency and voltage level of three-phase nominal AC voltage, single-phase nominal AC voltage, and nominal DC voltage may vary based on the application or design in accordance with one or more embodiments of the present invention.

Figure 3:
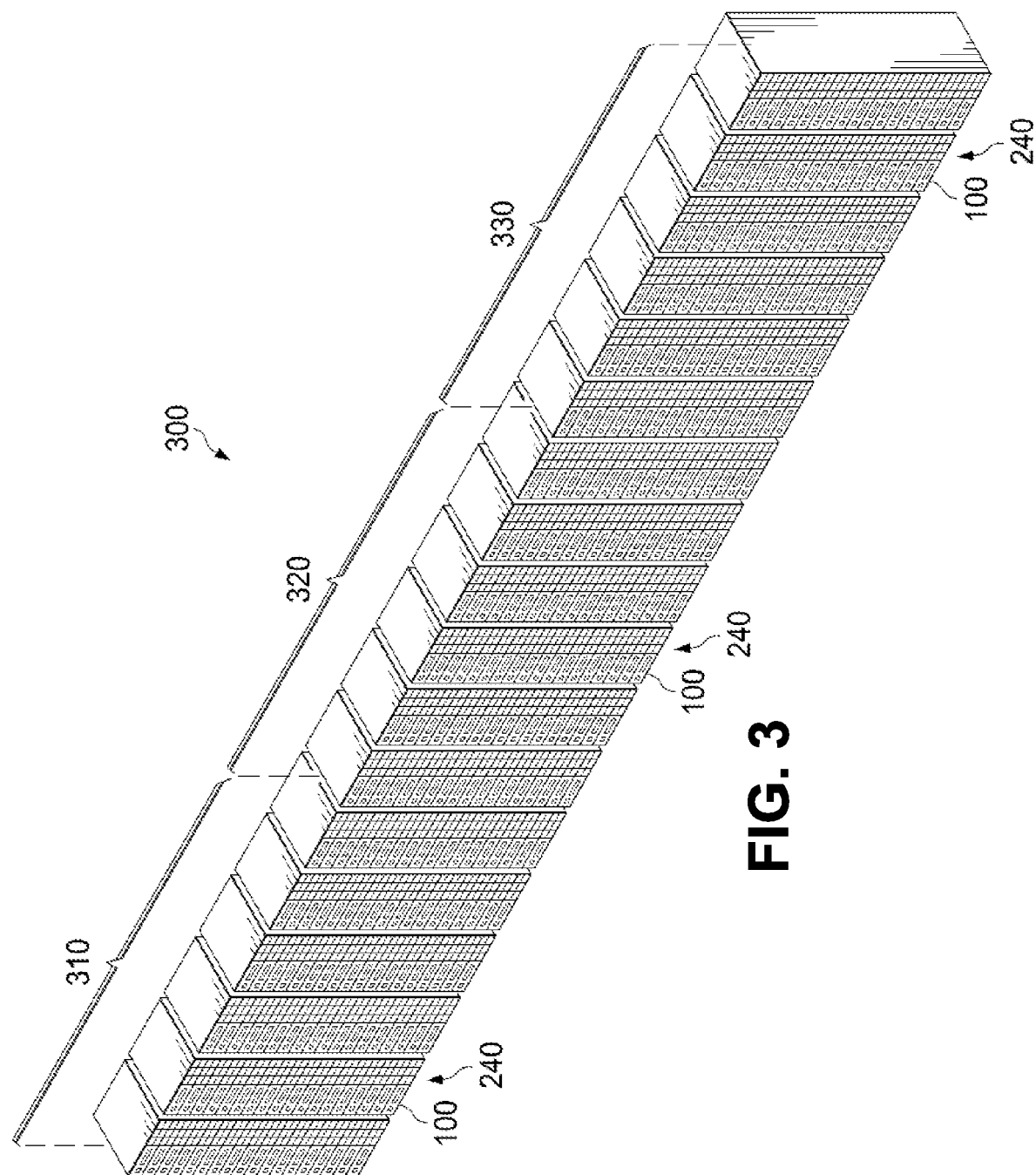
FIG. 3 shows a three-phase power distribution of a flexible datacenter in accordance with one or more embodiments of the present invention.

FIG. 3 shows a three-phase power distribution of a flexible datacenter 200 in accordance with one or more embodiments of the present invention. Flexible datacenter 200 may include a plurality of racks 240, each of which may include one or more computing systems 100 disposed therein. As discussed above, the behind-the-meter power input system (210 of FIG. 2) may provide three phases of three-phase nominal AC voltage to the power distribution system (215 of FIG. 2). The power distribution system (215 of FIG. 2) may controllably provide a single phase of three-phase nominal AC voltage to each computing system 100 or group 240 of computing systems 100 disposed within flexible datacenter 200. For example, a flexible datacenter 200 may include eighteen racks 240, each of which may include eighteen computing systems 100. The power distribution system (215 of FIG. 2) may control which phase of three-phase nominal AC voltage is provided to one or more computing systems 100, a rack 240 of computing systems 100, or a group (e.g., 310, 320, or 330) of racks 240 of computing systems 100.

In the figure, for purposes of illustration only, eighteen racks 240 are divided into a first group of six racks 310, a second group of six racks 320, and a third group of six racks 330, where each rack contains eighteen computing systems 100. The power distribution system (215 of FIG. 2) may, for example, provide a first phase of three-phase nominal AC voltage to the first group of six racks 310, a second phase of three-phase nominal AC voltage to the second group of six racks 320, and a third phase of three-phase nominal AC voltage to the third group of six racks 330. If the flexible datacenter (200 of FIG. 2) receives an operational directive from the local station (not shown) to provide power factor correction, the datacenter control system (220 of FIG. 2) may direct the power distribution system (215 of FIG. 2) to adjust which phase or phases of three-phase nominal AC voltage are used to provide the power factor correction required by the local station (not shown) or grid operator (not shown). One of ordinary skill in the art will recognize that, in addition to the power distribution, the load may be varied by adjusting the number of computing systems 100 operatively powered. As such, the flexible datacenter (200 of FIG. 2) may be configured to act as a capacitive or inductive load to provide the appropriate reactance necessary to achieve the power factor correction required by the local station (not shown).

Figure 4:
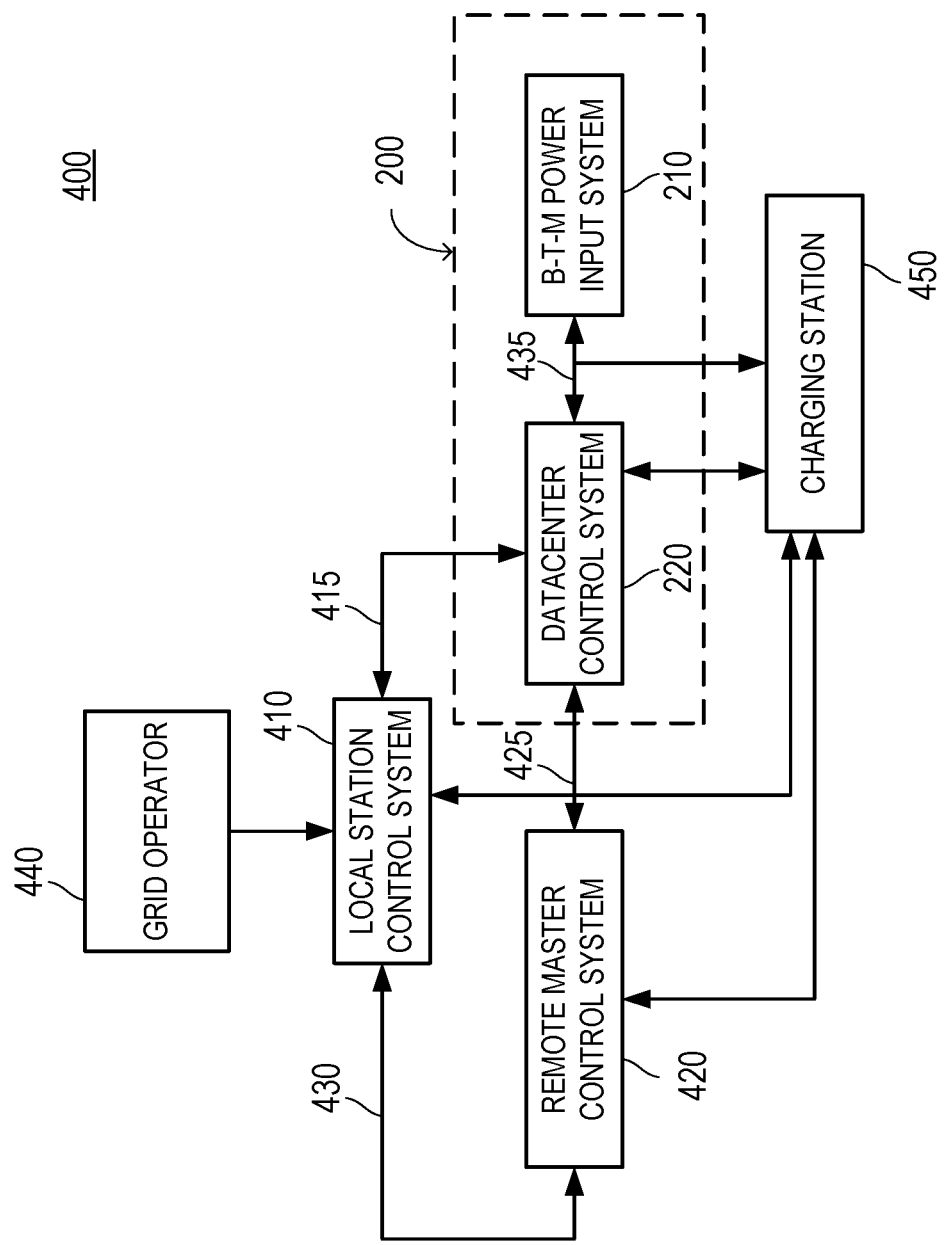
FIG. 4 shows a control distribution scheme of a flexible datacenter in accordance with one or more embodiments of the present invention.

FIG. 4 shows a control distribution scheme 400 of a flexible datacenter 200 in accordance with one or more embodiments of the present invention. Datacenter control system 220 may independently, or cooperatively with one or more of local station control system 410, remote master control system 420, and grid operator 440, modulate power delivery to flexible datacenter 200 and charging station 450. Specifically, power delivery may be dynamically adjusted based on conditions or operational directives.

Local station control system 410 may be a computing system (e.g., 100 of FIG. 1) that is configured to control various aspects of the local station (not independently illustrated) that generates power and sometimes generates unutilized behind-the-meter power. Local station control system 410 may communicate with remote master control system 420 over a networked connection 430 and with datacenter control system 220 over a networked or hardwired connection 415. Remote master control system 420 may be a computing system (e.g., 100 of FIG. 1) that is located offsite, but connected via a network connection 425 to datacenter control system 220, that is configured to provide supervisory or override control of flexible datacenter 200 or a fleet (not shown) of flexible datacenters 200. Grid operator 440 may be a computing system (e.g., 100 of FIG. 1) that is configured to control various aspects of the grid (not independently illustrated) that receives power from the local station (not independently illustrated). Grid operator 440 may communicate with local station control system 440 over a networked or hardwired connection 445.

Datacenter control system 220 and/or remote master control system 420 may monitor behind-the-meter power availability at the local station (not independently illustrated) and determine when a datacenter ramp-up condition is met and/or when power can be made available at the charging station 450. Unutilized behind-the-meter power availability may include one or more of excess local power generation, excess local power generation that the grid cannot accept, local power generation that is subject to economic curtailment, local power generation that is subject to reliability curtailment, local power generation that is subject to power factor correction, conditions where the cost for power is economically viable (e.g., low cost for power), situations where local power generation is prohibitively low, start up situations, transient situations, or testing situations where there is an economic advantage to using locally generated behind-the-meter power generation, specifically power available at little to no cost and with no associated transmission or distribution losses or costs.

In one instances, the datacenter ramp-up condition may be met if there is sufficient behind-the-meter power availability and there is no operational directive from local station control system 410, remote master control system 420, or grid operator 440 to go offline or reduce power. As such, datacenter control system 220 may enable 435 behind-the-meter power input system 210 to provide three-phase nominal AC voltage to the power distribution system (215 of FIG. 2) to power the plurality of computing systems (100 of FIG. 2) or a subset thereof and/or charging station 450. The charging station 450 may be located outside of the flexible datacenter 200, but may receive its control signals from the flexible datacenter 200. In the context of the present disclosure, the charging station 450 may have power supplied (or not supplied), based on the same criteria by which power is delivered to the one or more computing systems (100 of FIG. 2). For example, based on an operational directive for the flexible datacenter 200, the power supplied by the charging station 450 may be enabled or disabled.

In another instance, the ramp-up condition may be satisfied if there is sufficient behind-the-meter power availability by the charging station 450, the energy storage unit 1010, or a combination of the charging station 450, the energy storage unit 1010, and the previously-described computing hardware. In this instance, is sufficient behind-the-meter power availability may be a ramp-up condition that causes the charging station 450 to supply power to vehicles (or causes a notification of power availability) and/or the energy storage unit 1010 to charge batteries of the energy storage unit 1010.

Datacenter control system 220 may optionally direct one or more computing systems (100 of FIG. 2) to perform predetermined computational operations. For example, if the one or more computing systems (100 of FIG. 2) are configured to perform blockchain hashing operations, datacenter control system 220 may direct them to perform blockchain hashing operations for a specific blockchain application, such as, for example, Bitcoin, Litecoin, or Ethereum. Alternatively, one or more computing systems (100 of FIG. 2) may be configured to independently receive a computational directive from a network connection (not shown) to a peer-to-peer blockchain network (not shown) such as, for example, a network for a specific blockchain application, to perform predetermined computational operations.

Datacenter control system 220 may also optionally determine to route power to charging station 450 or a trigger condition may cause power to be routed to the charging station 450. In some examples, power routing to the charging station may be based in part on vehicles being coupled to the charging station 450, or another trigger criterion. Example trigger criteria may include a handshake signal between the vehicle and the charging station 450, a proximity sensor noticing the vehicle has come near the charging station 450, a vehicle operator requesting to charge his or her vehicle (possibly by way of a mobile application), an access control signal (e.g., a signal based on a vehicle entering a parking lot, passing a gate, etc.), and other possible trigger criteria as well. In another example, the charging station 450 may responsively request power based on the presence of vehicles. In other examples, power routing to the charging station 450 may be based on a power availability. In some examples, power availability at the charging station 450 may cause the charging station 450 to start providing power to vehicles connected to the charging station 450. Thus, in this example, the charging station 450 may provide an indication to control system 220 that it is ready to charge vehicles and to supply power when it is available.

In some further examples, the charging station 450 may be configured to provide notifications based on power availability. Notifications may be provided by way of mobile application, email, text, message, etc. to users of the charging station 450. The notification may specify that the charging station is operable to charge a vehicle. The notification may also specify a price for electricity from the charging station 450. Conversely, in some examples, the notification may specify that the charging station is no longer operable to charge a vehicle. In yet another example, the notification may specify a change in price for electricity from the charging station 450. In some further examples, notifications may be sent based on a geo-fenced area near the charging station 450. For example, notifications may be sent to mobile devices of vehicle owners within a predetermined area.

In another example, notifications may be sent based on a charger provider network. In this example, a group of charging stations 450 may form a charging provider network. The network of charging stations 450 may provide an end user with a listing of charging stations and whether or not each is presently supplying power. Further, the network may also specify a price of power at each respective charging station. In some examples, the network may be part of an operational fleet. The fleet may receive notifications of power availability. For example, a fleet of electric vehicles may include trucks, cars, planes, helicopters, etc.

Remote master control system 420 may specify to datacenter control system 220 what sufficient behind-the-meter power availability constitutes, or datacenter control system 220 may be programmed with a predetermined preference or criteria on which to make the determination independently. For example, in certain circumstances, sufficient behind-the-meter power availability may be less than that required to fully power the entire flexible datacenter 200 and/or charging station 450. In such circumstances, datacenter control system 220 may provide power to only a subset of computing systems (100 of FIG. 2), or operate the plurality of computing systems (100 of FIG. 2) in a lower power mode, that is within the sufficient, but less than full, range of power that is available and/or reduce or cut off power to the charging station 450.

While flexible datacenter 200 is online and operational, a datacenter ramp-down condition may be met when there is insufficient, or anticipated to be insufficient, behind-the-meter power availability or there is an operational directive from local station control system 410, remote master control system 420, or grid operator 440. Datacenter control system 220 may monitor and determine when there is insufficient, or anticipated to be insufficient, behind-the-meter power availability. As noted above, sufficiency may be specified by remote master control system 420 or datacenter control system 220 may be programmed with a predetermined preference or criteria on which to make the determination independently. An operational directive may be based on current dispatchability, forward looking forecasts for when unutilized behind-the-meter power is, or is expected to be, available, economic considerations, reliability considerations, operational considerations, or the discretion of the local station 410, remote master control 420, or grid operator 440. For example, local station control system 410, remote master control system 420, or grid operator 440 may issue an operational directive to flexible datacenter 200 to go offline and power down. When the datacenter ramp-down condition is met, datacenter control system 220 may disable power delivery to the plurality of computing systems (100 of FIG. 2) and the charging station 450. Datacenter control system 220 may disable 435 behind-the-meter power input system 210 from providing three-phase nominal AC voltage to the power distribution system (215 of FIG. 2) to power down the plurality of computing systems (100 of FIG. 2), while datacenter control system 220 remains powered and is capable of rebooting flexible datacenter 200 when unutilized behind-the-meter power becomes available again.

While flexible datacenter 200 is online and operational, changed conditions or an operational directive may cause datacenter control system 220 to modulate power consumption by flexible datacenter 200. Datacenter control system 220 may determine, or local station control system 410, remote master control system 420, or grid operator 440 may communicate, that a change in local conditions may result in less power generation, availability, or economic feasibility, than would be necessary to fully power flexible datacenter 200. In such situations, datacenter control system 220 may take steps to reduce or stop power consumption by flexible datacenter 200 (other than that required to maintain operation of datacenter control system 220) and charging station 450. Alternatively, local station control system 410, remote master control system 420, or grid operator 440, may issue an operational directive to reduce power consumption for any reason, the cause of which may be unknown. In response, datacenter control system 220 may dynamically reduce or withdraw power delivery to one or more computing systems (100 of FIG. 2) to and charging station 450 meet the dictate. Datacenter control system 220 may controllably provide three-phase nominal AC voltage to a smaller subset of computing systems (100 of FIG. 2) to reduce power consumption and provide no (or nominal) power to charging station 450. Datacenter control system 220 may dynamically reduce the power consumption of one or more computing systems (100 of FIG. 2) by reducing their operating frequency or forcing them into a lower power mode through a network directive. Datacenter control system 220 may dynamically reduce the power consumption of the charging station 450 by only providing nominal power to the charging station and charging station 450 may responsively issue a notification about the power reduction.

One of ordinary skill in the art will recognize that datacenter control system 220 may be configured to have a number of different configurations, such as a number or type or kind of computing systems (100 of FIG. 2) that may be powered, and in what operating mode, that correspond to a number of different ranges of sufficient and available unutilized behind-the-meter power availability. As such, datacenter control system 220 may modulate power delivery over a variety of ranges of sufficient and available unutilized behind-the-meter power availability.

Figure 5:
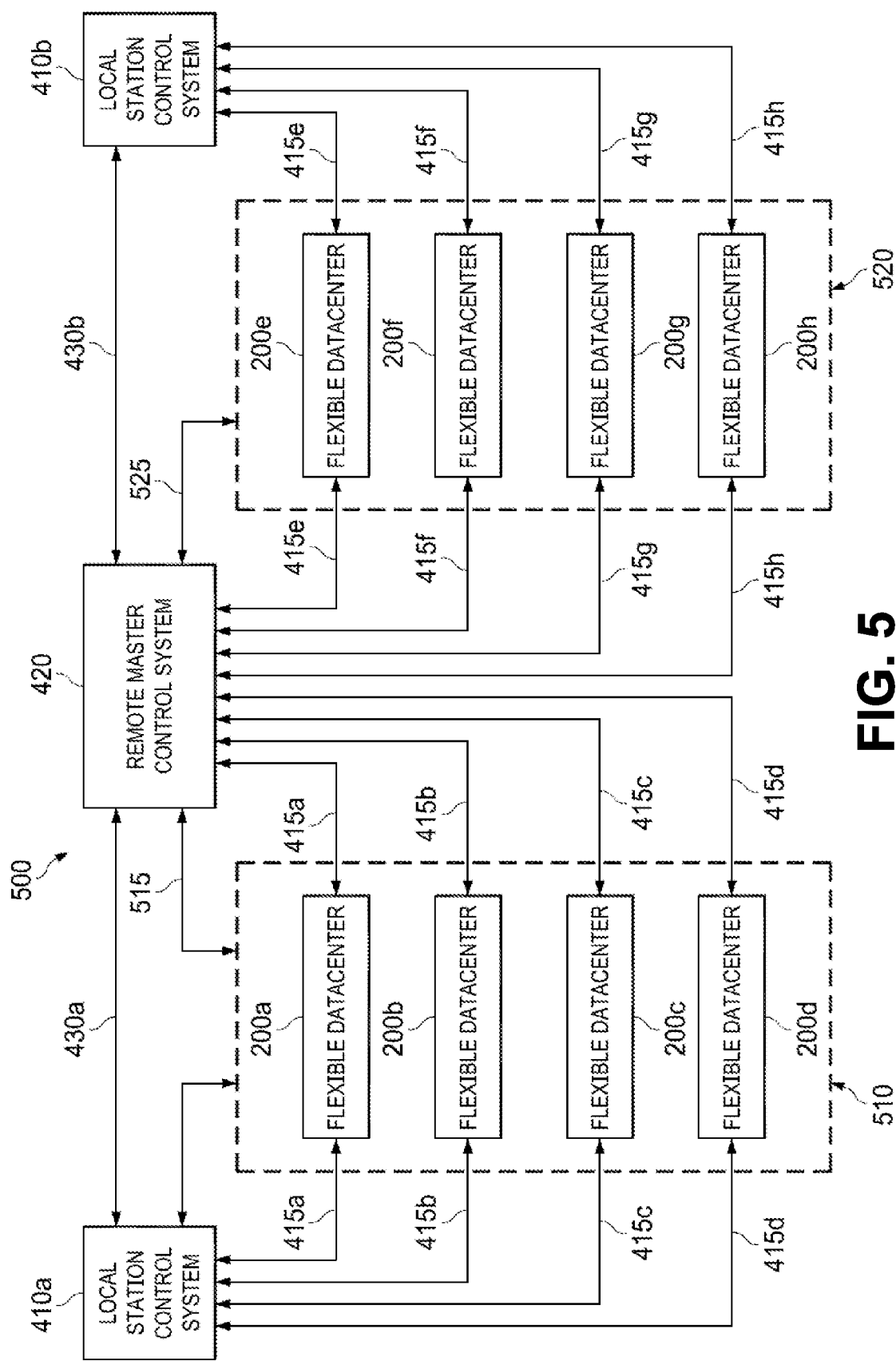
FIG. 5 shows a control distribution scheme of a fleet of flexible datacenters in accordance with one or more embodiments of the present invention.

FIG. 5 shows a control distribution of a fleet 500 of flexible datacenters 200 in accordance with one or more embodiments of the present invention. The control distribution of a flexible datacenter 200 shown and described with respect to FIG. 4 may be extended to a fleet 500 of flexible datacenters 200. For example, a first local station (not independently illustrated), such as, for example, a wind farm (not shown), may include a first plurality 510 of flexible datacenters 200a through 200d, which may be collocated or distributed across the local station (not shown). A second local station (not independently illustrated), such as, for example, another wind farm or a solar farm (not shown), may include a second plurality 520 of flexible datacenters 200e through 200h, which may be collocated or distributed across the local station (not shown). One of ordinary skill in the art will recognize that the number of flexible datacenters 200 deployed at a given station and the number of stations within the fleet may vary based on an application or design in accordance with one or more embodiments of the present invention.

Remote master control system 420 may provide supervisory control over fleet 500 of flexible datacenters 200 in a similar manner to that shown and described with respect to FIG. 4, with the added flexibility to make high level decisions with respect to fleet 500 that may be counterintuitive to a given station. Remote master control system 420 may make decisions regarding the issuance of operational directives to a given local station based on, for example, the status of each local station where flexible datacenters 200 are deployed, the workload distributed across fleet 500, and the expected computational demand required for the expected workload. In addition, remote master control system 420 may shift workloads from a first plurality 510 of flexible datacenters 200 to a second plurality 520 of flexible datacenters 200 for any reason, including, for example, a loss of unutilized behind-the-meter power availability at one local station and the availability of unutilized behind-the-meter power at another local station.

Figure 6:
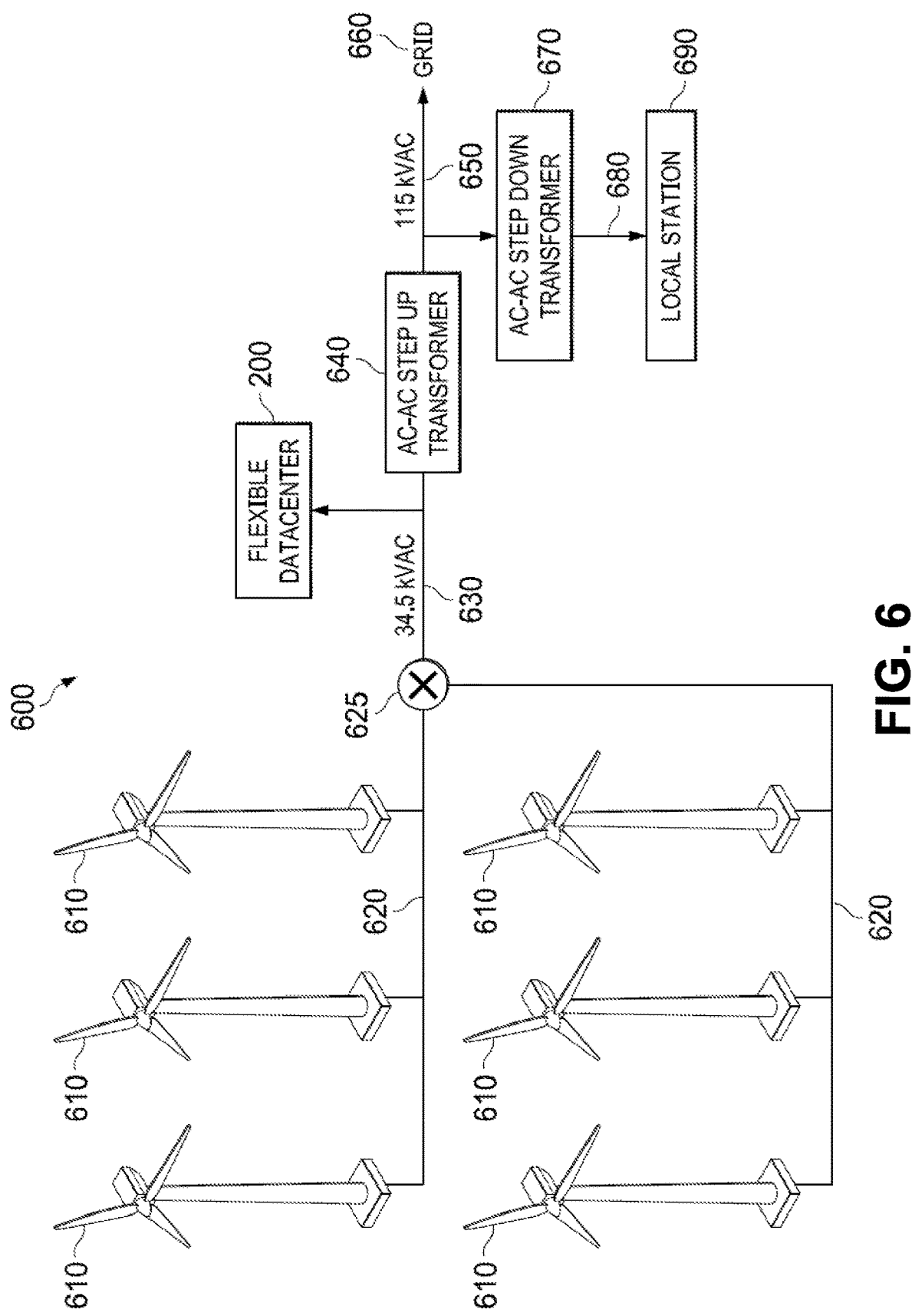
FIG. 6 shows a flexible datacenter powered by one or more wind turbines in accordance with one or more embodiments of the present invention.

FIG. 6 shows a flexible datacenter 200 powered by one or more wind turbines 610 in accordance with one or more embodiments of the present invention. A wind farm 600 typically includes a plurality of wind turbines 610, each of which intermittently generates a wind-generated AC voltage. The wind-generated AC voltage may vary based on a type, kind, or configuration of farm 600, turbine 610, and incident wind speed. The wind-generated AC voltage is typically input into a turbine AC-to-AC step-up transformer (not shown) that is disposed within the nacelle (not independently illustrated) or at the base of the mast (not independently illustrated) of turbine 610. The turbine AC-to-AC step up transformer (not shown) outputs three-phase wind-generated AC voltage 620. Three-phase wind-generated AC voltage 620 produced by the plurality of wind turbines 610 is collected 625 and provided 630 to another AC-to-AC step-up transformer 640 that steps up three-phase wind-generated AC voltage 620 to three-phase grid AC voltage 650 suitable for delivery to grid 660. Three-phase grid AC voltage 650 may be stepped down with an AC-to-AC step-down transformer 670 configured to produce three-phase local station AC voltage 680 provided to local station 690. One of ordinary skill in the art will recognize that the actual voltage levels may vary based on the type, kind, or number of wind turbines 610, the configuration or design of wind farm 600, and grid 660 that it feeds into.

The output side of AC-to-AC step-up transformer 640 that connects to grid 660 may be metered and is typically subject to transmission and distribution costs. In contrast, power consumed on the input side of AC-to-AC step-up transformer 640 may be considered behind-the-meter and is typically not subject to transmission and distribution costs. As such, one or more flexible datacenters 200 may be powered by three-phase wind-generated AC voltage 620. Specifically, in wind farm 600 applications, the three-phase behind-the-meter AC voltage used to power flexible datacenter 200 may be three-phase wind-generated AC voltage 620. As such, flexible datacenter 200 may reside behindthe-meter, avoid transmission and distribution costs, and may be dynamically powered when unutilized behind-the-meter power is available.

Unutilized behind-the-meter power availability may occur when there is excess local power generation. In high wind conditions, wind farm 600 may generate more power than, for example, AC-to-AC step-up transformer 640 is rated for. In such situations, wind farm 600 may have to take steps to protect its equipment from damage, which may include taking one or more turbines 610 offline or shunting their voltage to dummy loads or ground. Advantageously, one or more flexible datacenters 200 may be used to consume power on the input side of AC-to-AC step-up transformer 640, thereby allowing wind farm 600 to operate equipment within operating ranges while flexible datacenter 200 receives behind-the-meter power without transmission or distribution costs. The local station control system (not independently illustrated) of local station 690 may issue an operational directive to the one or more flexible datacenters 200 or to the remote master control system (420 of FIG. 4) to ramp-up to the desired power consumption level. When the operational directive requires the cooperative action of multiple flexible datacenters 200, the remote mater control system (420 of FIG. 4) may determine how to power each individual flexible datacenter 200 in accordance with the operational directive or provide an override to each flexible datacenter 200.

Another example of unutilized behind-the-meter power availability is when grid 660 cannot, for whatever reason, take the power being produced by wind farm 600. In such situations, wind farm 600 may have to take one or more turbines 610 offline or shunt their voltage to dummy loads or ground. Advantageously, one or more flexible datacenters 200 may be used to consume power on the input side of AC-to-AC step-up transformer 640, thereby allowing wind farm 600 to either produce power to grid 660 at a lower level or shut down transformer 640 entirely while flexible datacenter 200 receives behind-the-meter power without transmission or distribution costs. The local station control system (not independently illustrated) of local station 690 or the grid operator (not independently illustrated) of grid 660 may issue an operational directive to the one or more flexible datacenters 200 or to the remote master control system (420 of FIG. 4) to ramp-up to the desired power consumption level. When the operational directive requires the cooperative action of multiple flexible datacenters 200, the remote master control system (420 of FIG. 4) may determine how to power each individual flexible datacenter 200 in accordance with the operational directive or provide an override to each flexible datacenter 200.

Another example of unutilized behind-the-meter power availability is when wind farm 600 is selling power to grid 660 at a negative price that is offset by a production tax credit. In certain circumstances, the value of the production tax credit may exceed the price wind farm 600 would have to pay to grid 660 to offload their generated power. Advantageously, one or more flexible datacenters 200 may be used to consume power behind-the-meter, thereby allowing wind farm 600 to produce and obtain the production tax credit, but sell less power to grid 660 at the negative price. The local station control system (not independently illustrated) of local station 690 may issue an operational directive to the one or more flexible datacenters 200 or to the remote master control system (420 of FIG. 4) to ramp-up to the desired power consumption level. When the operational directive requires the cooperative action of multiple flexible datacenter 200, the remote master control system (420 of FIG. 4) may determine how to power each individual flexible datacenter 200 in accordance with the operational directive or provide an override to each flexible datacenter 200.

Another example of unutilized behind-the-meter power availability is when wind farm 600 is selling power to grid 660 at a negative price because grid 660 is oversupplied or is instructed to stand down and stop producing altogether. The grid operator (not independently illustrated) may select certain power generation stations to go offline and stop producing power to grid 660. Advantageously, one or more flexible datacenters 200 may be used to consume power behind-the-meter, thereby allowing wind farm 600 to stop producing power to grid 660, but making productive use of the power generated behind-the-meter without transmission or distribution costs. The local station control system (not independently illustrated) of the local station 690 or the grid operator (not independently illustrated) of grid 660 may issue an operational directive to the one or more flexible datacenters 200 or to the remote master control system (420 of FIG. 4) to ramp-up to the desired power consumption level. When the operational directive requires the cooperative action of multiple flexible datacenters 200, the remote master control system (420 of FIG. 4) may determine how to power each individual flexible datacenter 200 in accordance with the operational directive or provide an override to each flexible datacenter 200.

Another example of unutilized behind-the-meter power availability is when wind farm 600 is producing power to grid 660 that is unstable, out of phase, or at the wrong frequency, or grid 660 is already unstable, out of phase, or at the wrong frequency for whatever reason. The grid operator (not independently illustrated) may select certain power generation stations to go offline and stop producing power to grid 660. Advantageously, one or more flexible datacenters 200 may be used to consume power behind-the-meter, thereby allowing wind farm 600 to stop producing power to grid 660, but make productive use of the power generated behind-the-meter without transmission or distribution costs. The local station control system (not independently illustrated) of local station 690 may issue an operational directive to the one or more flexible datacenters 200 or to the remote master control system (420 of FIG. 4) to ramp-up to the desired power consumption level. When the operational directive requires the cooperative action of multiple flexible datacenters 200, the remote master control system (420 of FIG. 4) may determine how to power each individual flexible datacenter 200 in accordance with the operational directive or provide an override to each flexible datacenter 200.

Further examples of unutilized behind-the-meter power availability is when wind farm 600 experiences low wind conditions that make it not economically feasible to power up certain components, such as, for example, the local station (not independently illustrated), but there may be sufficient behind-the-meter power availability to power one or more flexible datacenters 200. Similarly, unutilized behind-the-meter power availability may occur when wind farm 600 is starting up, or testing, one or more turbines 610. Turbines 610 are frequently offline for installation, maintenance, and service and must be tested prior to coming online as part of the array. One or more flexible datacenters 200 may be powered by one or more turbines 610 that are offline from farm 600. The above-noted examples of when unutilized behind-the-meter power is available are merely exemplary and are not intended to limit the scope of what one of ordinary skill in the art would recognize as unutilized behind-the-meter power availability. Unutilized behind-themeter power availability may occur anytime there is power available and accessible behind-the-meter that is not subject to transmission and distribution costs and there is an economic advantage to using it.

One of ordinary skill in the art will recognize that wind farm 600 and wind turbine 610 may vary based on an application or design in accordance with one or more embodiments of the present invention.

Figure 7:
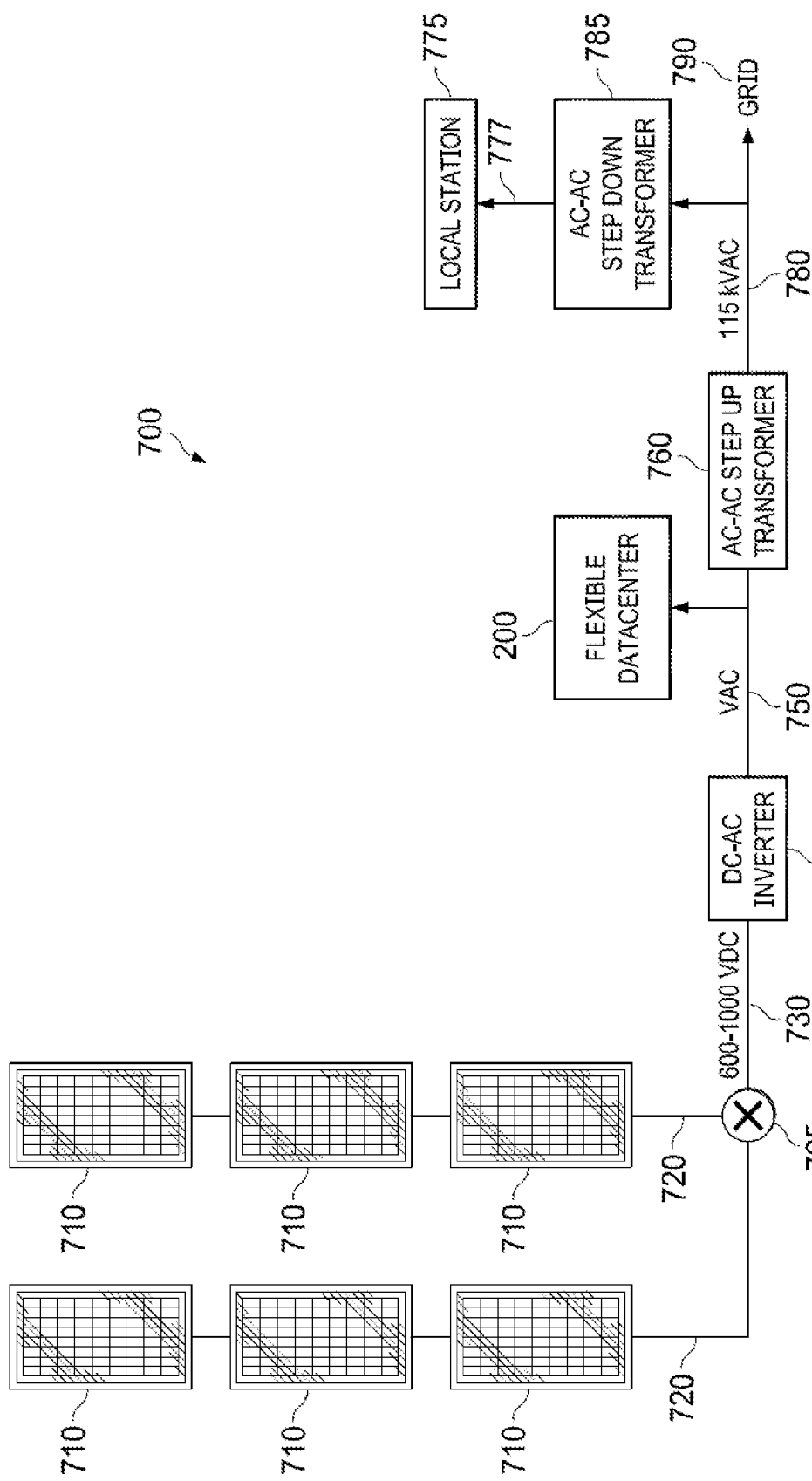
FIG. 7 shows a flexible datacenter powered by one or more solar panels in accordance with one or more embodiments of the present invention.

FIG. 7 shows a flexible datacenter 200 powered by one or more solar panels 710 in accordance with one or more embodiments of the present invention. A solar farm 700 typically includes a plurality of solar panels 710, each of which intermittently generates a solar-generated DC voltage 720. Solar-generated DC voltage 720 may vary based on a type, kind, or configuration of farm 700, panel 710, and incident sunlight. Solar-generated DC voltage 720 produced by the plurality of solar panels 710 is collected 725 and provided 730 to a DC-to-AC inverter that converts solar-generated DC voltage into three-phase solar-generated AC voltage 750. Three-phase solar-generated AC voltage 750 is provided to an AC-to-AC step-up transformer 760 that steps up three-phase solar-generated AC voltage to three-phase grid AC voltage 790. Three-phase grid AC voltage 790 may be stepped down with an AC-to-AC step-down transformer 785 configured to produce three-phase local station AC voltage 777 provided to local station 775. One of ordinary skill in the art will recognize that the actual voltage levels may vary based on the type, kind, or number of solar panels 710, the configuration or design of solar farm 700, and grid 790 that it feeds into. In some embodiments, the solar farm 700 may provide DC power directly to flexible datacenter 200 (and charging station 450) without a conversion to AC via the DC-to-AC inverter 740.

The output side of AC-to-AC step-up transformer 760 that connects to grid 790 may be metered and is typically subject to transmission and distribution costs. In contrast, power consumed on the input side of AC-to-AC step-up transformer 760 may be considered behind-the-meter and is typically not subject to transmission and distribution costs. As such, one or more flexible datacenters 200 and charging station 450 may be powered by three-phase solar-generated AC voltage 750. Specifically, in solar farm 700 applications, the three-phase behind-the-meter AC voltage used to power flexible datacenter 200 may be three-phase solar-generated AC voltage 750. As such, flexible datacenter 200 may reside behind-the-meter, avoid transmission and distribution costs, and may be dynamically powered when unutilized behind-the-meter power is available.

Unutilized behind-the-meter power availability may occur when there is excess local power generation. In high incident sunlight situations, solar farm 700 may generate more power than, for example, AC-to-AC step-up transformer 760 is rated for. In such situations, solar farm 700 may have to take steps to protect its equipment from damage, which may include taking one or more panels 710 offline or shunting their voltage to dummy loads or ground. Advantageously, one or more flexible datacenters 200 may be used to consume power on the input side of AC-to-AC step-up transformer 760, thereby allowing solar farm 700 to operate equipment within operating ranges while flexible datacenter 200 receives behind-the-meter power without transmission or distribution costs. The local station control system (not independently illustrated) of local station 775 may issue an operational directive to the one or more flexible datacenters 200 or to the remote master control system (420 of FIG. 4) to ramp-up to the desired power consumption level. When the operational directive requires the cooperative action of multiple flexible datacenters 200, the remote mater control system (420 of FIG. 4) may determine how to power each individual flexible datacenter 200 in accordance with the operational directive or provide an override to each flexible datacenter 200.

Another example of unutilized behind-the-meter power availability is when grid 790 cannot, for whatever reason, take the power being produced by solar farm 700. In such situations, solar farm 700 may have to take one or more panels 710 offline or shunt their voltage to dummy loads or ground. Advantageously, one or more flexible datacenters 200 may be used to consume power on the input side of AC-to-AC step-up transformer 760, thereby allowing solar farm 700 to either produce power to grid 790 at a lower level or shut down transformer 760 entirely while flexible datacenter 200 receives behind-the-meter power without transmission or distribution costs. The local station control system (not independently illustrated) of local station 775 or the grid operator (not independently illustrated) of grid 790 may issue an operational directive to the one or more flexible datacenters 200 or to the remote master control system (420 of FIG. 4) to ramp-up to the desired power consumption level. When the operational directive requires the cooperative action of multiple flexible datacenters 200, the remote master control system (420 of FIG. 4) may determine how to power each individual flexible datacenter 200 in accordance with the operational directive or provide an override to each flexible datacenter 200.

Another example of unutilized behind-the-meter power availability is when solar farm 700 is selling power to grid 790 at a negative price that is offset by a production tax credit. In certain circumstances, the value of the production tax credit may exceed the price solar farm 700 would have to pay to grid 790 to offload their generated power. Advantageously, one or more flexible datacenters 200 may be used to consume power behind-the-meter, thereby allowing solar farm 700 to produce and obtain the production tax credit, but sell less power to grid 790 at the negative price. The local station control system (not independently illustrated) of local station 775 may issue an operational directive to the one or more flexible datacenters 200 or to the remote master control system (420 of FIG. 4) to ramp-up to the desired power consumption level. When the operational directive requires the cooperative action of multiple flexible datacenter 200, the remote master control system (420 of FIG. 4) may determine how to power each individual flexible datacenter 200 in accordance with the operational directive or provide an override to each flexible datacenter 200.

Another example of unutilized behind-the-meter power availability is when solar farm 700 is selling power to grid 790 at a negative price because grid 790 is oversupplied or is instructed to stand down and stop producing altogether. The grid operator (not independently illustrated) may select certain power generation stations to go offline and stop producing power to grid 790. Advantageously, one or more flexible datacenters 200 may be used to consume power behind-the-meter, thereby allowing solar farm 700 to stop producing power to grid 790, but making productive use of the power generated behind-the-meter without transmission or distribution costs. The local station control system (not independently illustrated) of the local station 775 or the grid operator (not independently illustrated) of grid 790 may issue an operational directive to the one or more flexible datacenters 200 or to the remote master control system (420 of FIG. 4) to ramp-up to the desired power consumption level. When the operational directive requires the cooperative action of multiple flexible datacenters 200, the remote master control system (420 of FIG. 4) may determine how to power each individual flexible datacenter 200 in accordance with the operational directive or provide an override to each flexible datacenter 200.

Another example of unutilized behind-the-meter power availability is when solar farm 700 is producing power to grid 790 that is unstable, out of phase, or at the wrong frequency, or grid 790 is already unstable, out of phase, or at the wrong frequency for whatever reason. The grid operator (not independently illustrated) may select certain power generation stations to go offline and stop producing power to grid 790. Advantageously, one or more flexible datacenters 200 may be used to consume power behind-the-meter, thereby allowing solar farm 700 to stop producing power to grid 790, but make productive use of the power generated behind-the-meter without transmission or distribution costs. The local station control system (not independently illustrated) of local station 775 may issue an operational directive to the one or more flexible datacenters 200 or to the remote master control system (420 of FIG. 4) to ramp-up to the desired power consumption level. When the operational directive requires the cooperative action of multiple flexible datacenters 200, the remote master control system (420 of FIG. 4) may determine how to power each individual flexible datacenter 200 in accordance with the operational directive or provide an override to each flexible datacenter 200.

Further examples of unutilized behind-the-meter power availability is when solar farm 700 experiences intermittent cloud cover such that it is not economically feasible to power up certain components, such as, for example local station 775, but there may be sufficient behind-the-meter power availability to power one or more flexible datacenters 200. Similarly, unutilized behind-the-meter power availability may occur when solar farm 700 is starting up, or testing, one or more panels 710. Panels 710 are frequently offline for installation, maintenance, and service and must be tested prior to coming online as part of the array. One or more flexible datacenters 200 may be powered by one or more panels 710 that are offline from farm 700. The above-noted examples of when unutilized behind-the-meter power is available are merely exemplary and are not intended to limit the scope of what one of ordinary skill in the art would recognize as unutilized behind-the-meter power availability. Behind-the-meter power availability may occur anytime there is power available and accessible behind-the-meter that is not subject to transmission and distribution costs and there is an economic advantage to using it.

One of ordinary skill in the art will recognize that solar farm 700 and solar panel 710 may vary based on an application or design in accordance with one or more embodiments of the present invention.

Figure 8:
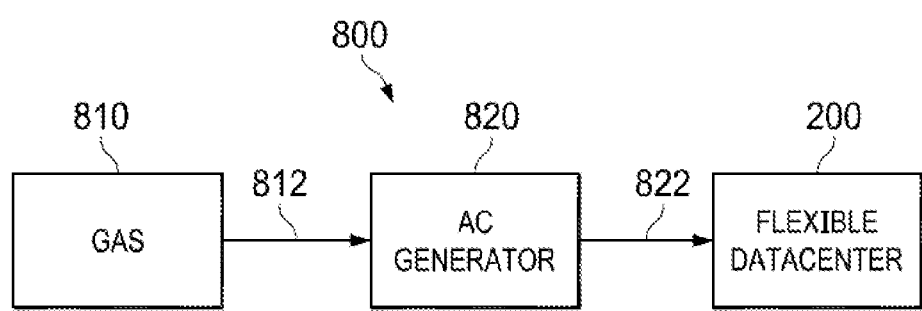
FIG. 8 shows a flexible datacenter powered by flare gas in accordance with one or more embodiments of the present invention.

FIG. 8 shows a flexible datacenter 200 powered by flare gas 800 in accordance with one or more embodiments of the present invention. Flare gas 800 is combustible gas produced as a product or by-product of petroleum refineries, chemical plants, natural gas processing plants, oil and gas drilling rigs, and oil and gas production facilities. Flare gas 800 is typically burned off through a flare stack (not shown) or vented into the air. In one or more embodiments of the present invention, flare gas 800 may be diverted 812 to a gas-powered generator that produces three-phase gas-generated AC voltage 822. This power may be considered behind-the-meter and is not subject to transmission and distribution costs. As such, one or more flexible datacenters 200 may be powered by three-phase gas-generated AC voltage. Specifically, the three-phase behind-the-meter AC voltage used to power flexible datacenter 200 may be three-phase gas-generated AC voltage 822. Accordingly, flexible datacenter 200 may reside behind-the-meter, avoid transmission and distribution costs, and may be dynamically powered when unutilized behind-the-meter power is available.

Figure 9A:
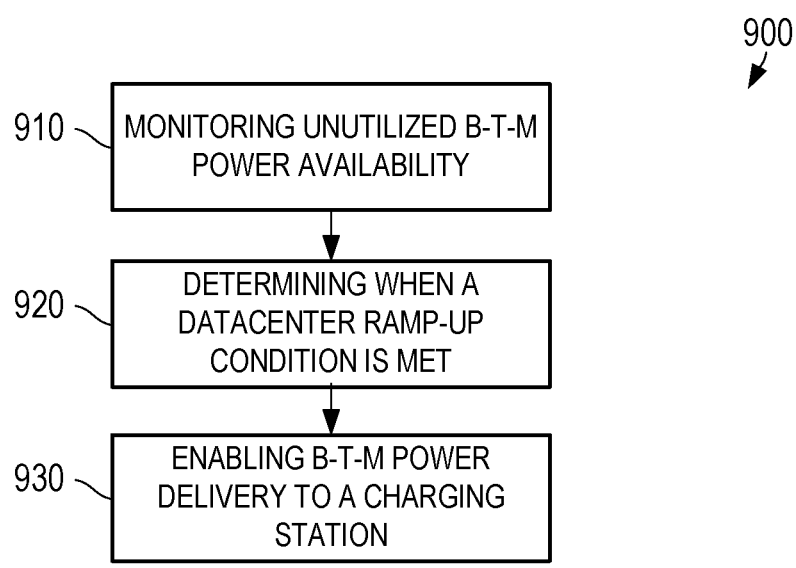
FIG. 9A shows a method of dynamic power delivery to a flexible datacenter using available behind-the-meter power in accordance with one or more embodiments of the present invention.

FIG. 9A shows a method of dynamic power delivery to a flexible datacenter (200 of FIG. 2) using behind-the-meter power 900 in accordance with one or more embodiments of the present invention. In step 910, the datacenter control system (220 of FIG. 4), or the remote master control system (420 of FIG. 4), may monitor behind-the-meter power availability. In certain embodiments, monitoring may include receiving information or an operational directive from the local station control system (410 of FIG. 4) or the grid operator (440 of FIG. 4) corresponding to behind-the-meter power availability.

In step 920, the datacenter control system (220 of FIG. 4), or the remote master control system (420 of FIG. 4), may determine when a datacenter ramp-up condition is met. In certain embodiments, the datacenter ramp-up condition may be met when there is sufficient behind-the-meter power availability and there is no operational directive from the local station to go offline or reduce power. In step 930, the datacenter control system (220 of FIG. 4) may enable behind-the-meter power delivery to a charging station 450 (and possibly one or more computing systems, like 100 of FIG. 2). At step 930, the charging station 450 may be able to supply power to vehicles coupled to charging station 450. Additionally, at step 930 a notification may be sent indicating power availability at the charging station 450.

While operational, the datacenter control system (220 of FIG. 4), or the remote master control system (420 of FIG. 4), may receive an operational directive to modulate power consumption. In certain embodiments, the operational directive may be a directive to reduce power consumption. In such embodiments, the datacenter control system (220 of FIG. 4) or the remote master control system (420 of FIG. 4) may dynamically reduce power delivery to the charging station 450 (and possibly one or more computing systems, like 100 of FIG. 2) or dynamically reduce power consumption of one or more computing systems. In other embodiments, the operational directive may be a directive to provide a power factor correction factor. In such embodiments, the datacenter control system (220 of FIG. 4) or the remote master control system (420 of FIG. 4) may dynamically adjust power delivery to the charging station 450 (and possibly one or more computing systems, like 100 of FIG. 2) to achieve a desired power factor correction factor. In still other embodiments, the operational directive may be a directive to go offline or power down. In such embodiments, the datacenter control system (220 of FIG. 4) may disable power delivery to the charging station 450 (and possibly one or more computing systems, like 100 of FIG. 2).

Figure 9B:
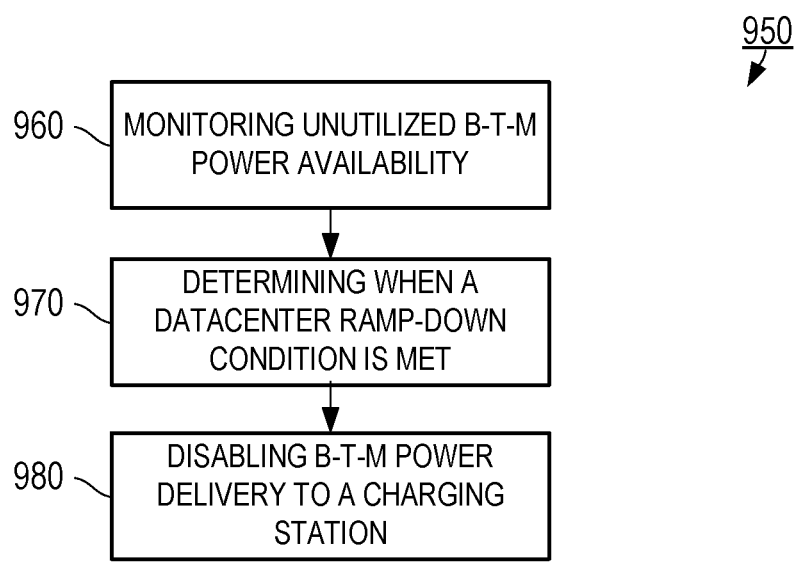
FIG. 9B shows another method of dynamic power delivery to a flexible datacenter using behind-the-meter power in accordance with one or more embodiments of the present invention.

As such, FIG. 9B shows a method of dynamic power delivery to a flexible datacenter (200 of FIG. 2) using behind-the-meter power 950 in accordance with one or more embodiments of the present invention. In step 960, the datacenter control system (220 of FIG. 4), or the remote master control system (420 of FIG. 4), may monitor behind-the-meter power availability. In certain embodiments, monitoring may include receiving information or an operational directive from the local station control system (410 of FIG. 4) or the grid operator (440 of FIG. 4) corresponding to behind-the-meter power availability.

In step 970, the datacenter control system (220 of FIG. 4), or the remote master control system (420 of FIG. 4), may determine when a datacenter ramp-down condition is met. In certain embodiments, the datacenter ramp-down condition may be met when there is insufficient behind-the-meter power availability or anticipated to be insufficient behind-the-meter power availability or there is an operational directive from the local station to go offline or reduce power. In step 980, the datacenter control system (220 of FIG. 4) may disable behind-the-meter power delivery to the charging station 450 (and possibly one or more computing systems, like 100 of FIG. 2). At step 980, the charging station 450 may stop supplying power to vehicles coupled to charging station 450. Additionally, at step 980 a notification may be sent indicating the lack of power availability at the charging station 450.

After either step 930 and/or 980, once ramped-up or ramped-down, the datacenter control system (220 of FIG. 4) remains powered and in communication with the remote master control system (420 of FIG. 4) so that it may dynamically alter the power of the flexible datacenter (200 of FIG. 2) when conditions change.

One of ordinary skill in the art will recognize that a datacenter control system (220 of FIG. 4) may dynamically modulate power delivery to one or more computing systems (100 of FIG. 2) of a flexible datacenter (200 of FIG. 2) based on behind-the-meter power availability or an operational directive. The flexible datacenter (200 of FIG. 2) may transition between a fully powered down state (while the datacenter control system remains powered), a fully powered up state, and various intermediate states in between. In addition, flexible datacenter (200 of FIG. 2) may have a blackout state, where all power consumption, including that of the datacenter control system (220 of FIG. 4) is halted. However, once the flexible datacenter (200 of FIG. 2) enters the blackout state, it will have to be manually rebooted to restore power to datacenter control system (220 of FIG. 4). Local station conditions or operational directives may cause flexible datacenter (200 of FIG. 2) to ramp-up, reduce power consumption, change power factor, or ramp-down.

Figure 10:
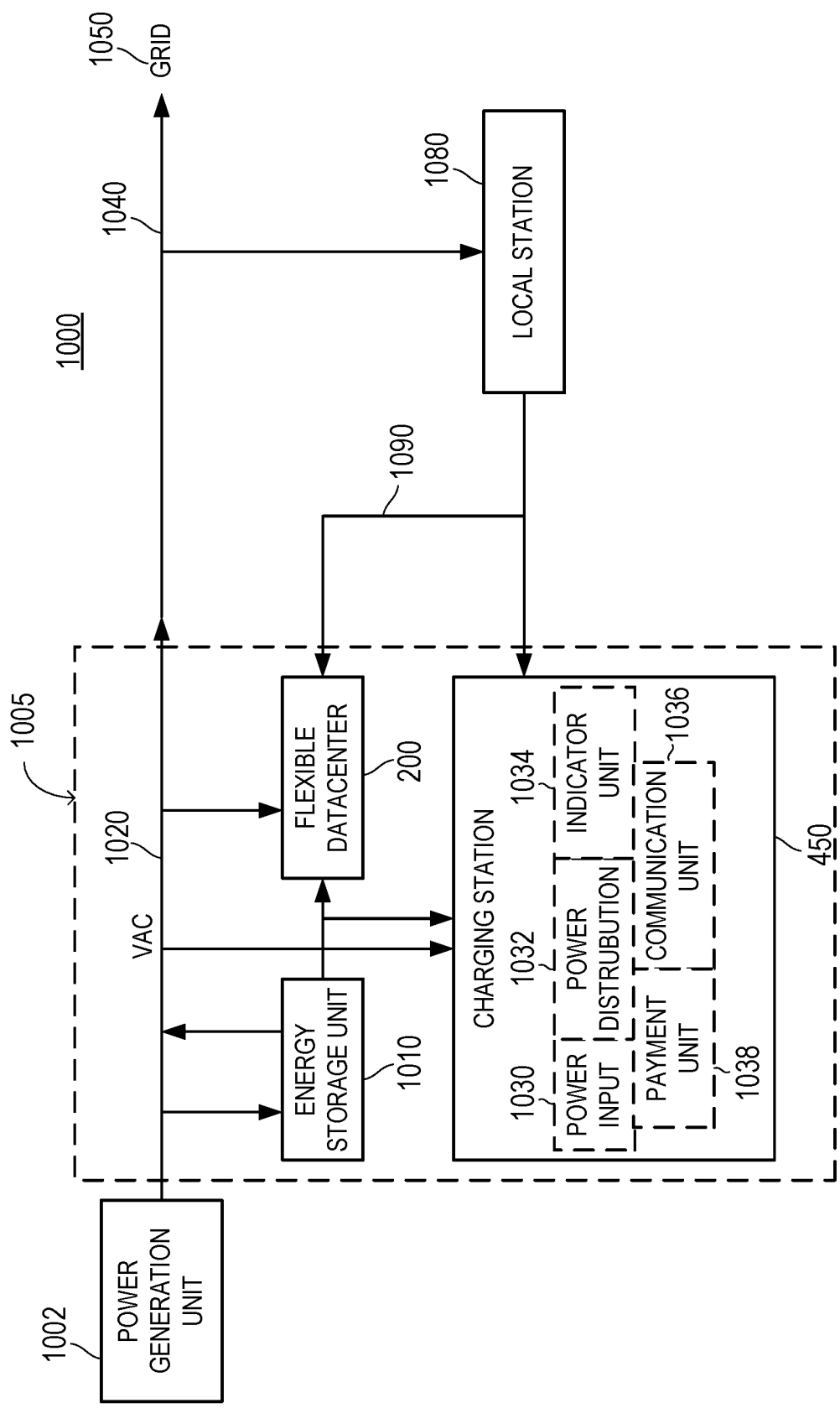
FIG. 10A shows a power distribution scheme with a flexible datacenter and energy storage unit in accordance with one or more embodiments of the present invention.
FIG. 10B shows a charging station in accordance with one or more embodiments of the present invention.
Figure 10A:
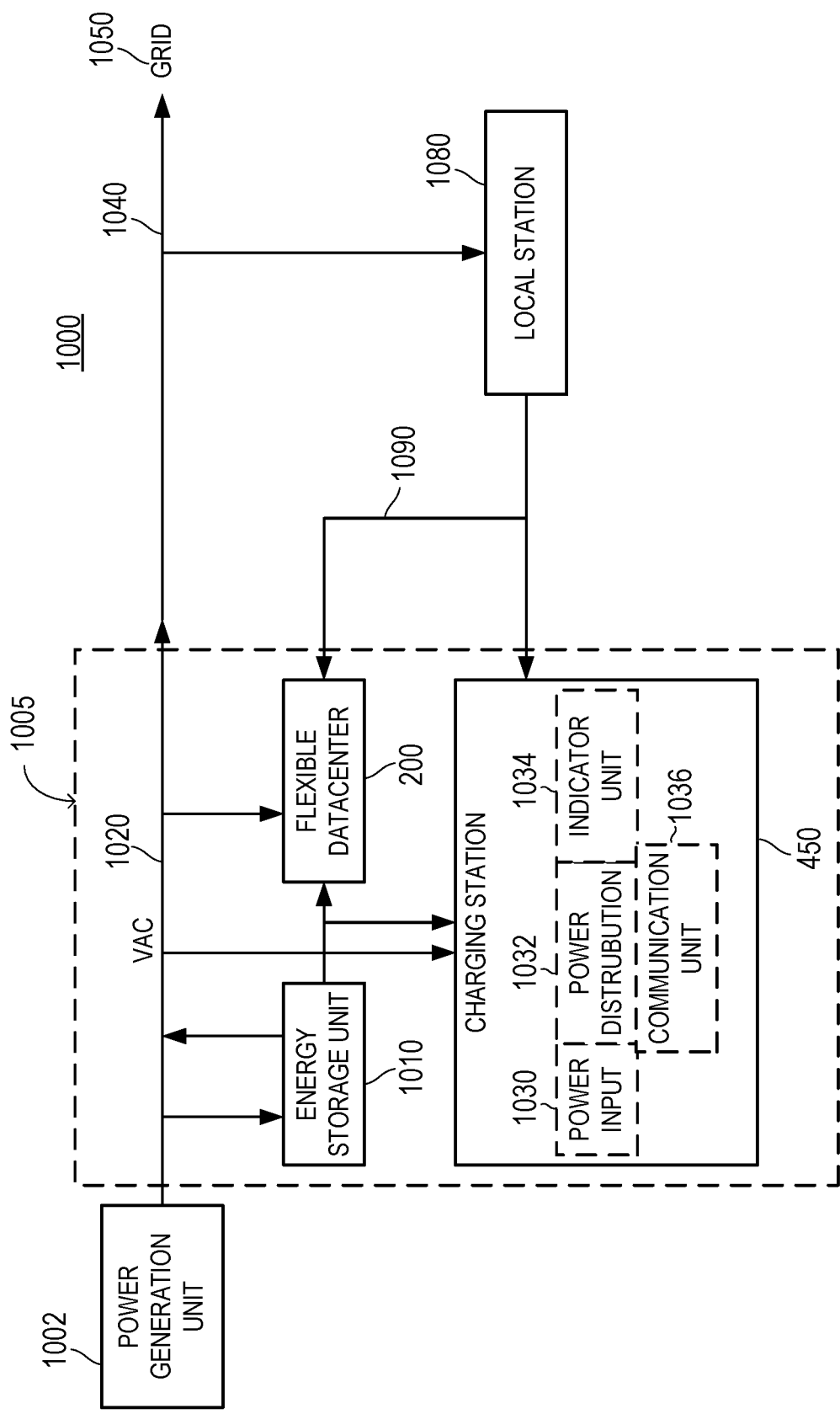

FIG. 10A shows a power distribution scheme 1000 with a flexible datacenter (200 of FIG. 2), a charging station (450 of FIG. 4), and an energy storage unit 1010 in accordance with one or more embodiments of the present invention. The power distribution scheme 1000 is similar to the schemes illustrated in FIG. 6 and FIG. 7, with the addition of energy storage unit 1010 and AC voltage 1090. Components and aspects illustrated and/or described in FIG. 10A that are similar or the same as components or aspects illustrated and/or described in FIG. 6 and FIG. 7 should be considered to have the same characteristics as previously illustrated and/or described.

Power generation unit 1002 generates behind-the-meter power and may include, for example, one or more wind turbines (610 of FIG. 6) with three-phase wind-generated AC voltage (620 of FIG. 6) collected at (625 of FIG. 6). As another example, power generation unit 1002 may include all of the following: one or more solar panels (710 of FIG. 7) with DC voltage (720 of FIG. 7) collected at 725 (of FIG. 6) and provided (730 of FIG. 7) to a DC-AC inverter (740 of FIG. 7). The power generation unit 1002 supplies behind-the-meter AC voltage 1020, such as three-phase AC (630 of FIG. 6 or 750 of FIG. 7), to an AC-AC-step up transformer. The AC-AC-step up transformer supplies high voltage AC power 1040 out to the grid 1050 and power derived from this source may be considered grid- or metered-power. As in FIG. 6 and FIG. 7, three-phase grid AC voltage 1040 may be stepped down with an AC-to-AC step-down transformer configured to produce three-phase local station AC voltage provided to local station 1080. In cases of renewable power generation, power generation unit 1002 will typically generate power on an intermittent basis.

Grid power may be routed back to the flexible datacenter 200 as AC voltage 1090 and used to power the datacenter control system (220 of FIG. 4), the plurality of computing systems (100 of FIG. 3), and/or charging station (450 of FIG. 4). As described with respect to FIG. 6 and FIG. 7, flexible datacenter 200 may be connected to, and configured to receive, behind-the-meter AC voltage 1020. The AC voltage 1090 provided to the charging station 450 may be 480V AC. In some further examples, power may be converted to DC power before being supplied to the charging station 450.

Also within the behind-the-meter envelope 1005 is energy storage unit 1010. Energy storage unit 1010 is a grid-scale power storage system and may take numerous forms. For example, energy storage unit 1010 may be a battery system, a kinetic storage system (e.g., flywheels), a compressed gas storage system, a thermodynamic storage system, or any other system that can accept and return behind-the-meter AC voltage 1020 and can supply AC voltage to flexible datacenter 200. Energy storage unit 1010 may include one or more individual storage systems, which together form energy storage unit 1010.

Figure 10B:
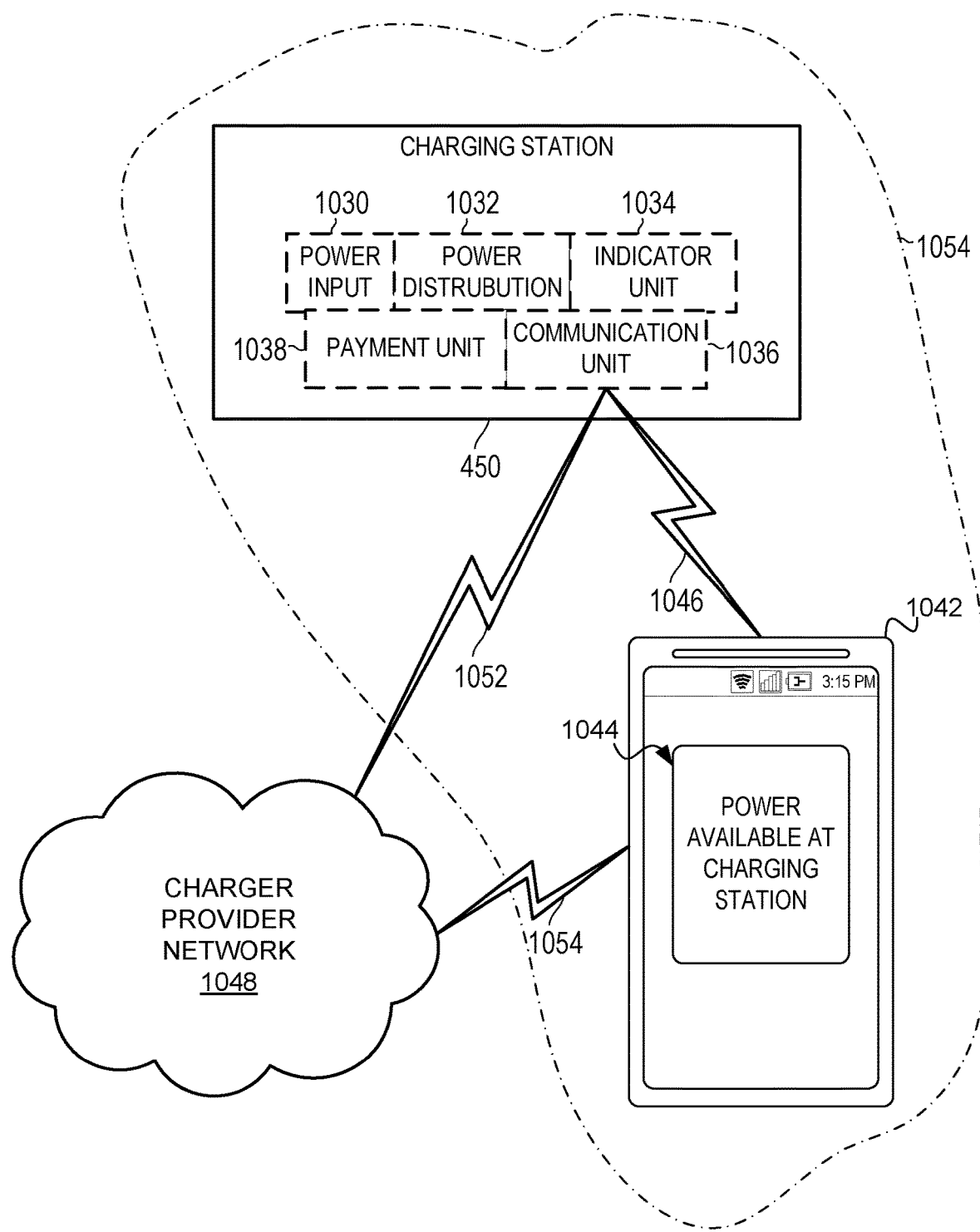

Also within the behind-the-meter envelope 1005 is charging station 450 (shown further in FIG. 10B). Charging station 450 is a grid-scale power supply system and may take numerous forms. For example, charging station 450 may be configured to provide electricity to charge one or more electric vehicles at a given time. The charging station 450 has a power input 1030 and a power distribution system 1032. In some examples, the charging station 450 may also include an indicator unit 1034. The power distribution system 1032 includes at least one vehicle-charging interface to supply power to the vehicle. In one example, the vehicle-charging interface includes at least one charging cable for an electric vehicle and may include a plurality of charging cables so more than one car may be charged at once. In various examples, different standardized charging ports may be used to couple the charging station 450 to vehicle. In some further examples, the charging station 450 may be able to supply power to a vehicle wirelessly through the vehicle-charging interface.

The power distribution system 1032 also is configured to receive power by way of the power input 1030 and convert the voltage, current, phase, etc. to charge electric vehicle. In various examples, the electricity provided by the charging station 450 to electric vehicles may be 120V, 240V, 500V, or other charging voltage. The charging voltage may be adjustable based on the electric vehicles using the charging station 450 and/or power availability. Additionally, the charging station 450 may provide either DC or AC power, depending on the needs of the respective vehicle. Charging of electric vehicles by the charging station may be based on any of the four charging modes specified by the Society of Automotive Engineers (SAE). The charging station 450 may be able to provide electricity from any of the power generation unit 1002, the energy storage unit 1010, and/or the local station 1080, alone or in combination simultaneously, to a vehicle coupled to the charging station 450 based on an electric vehicle charging standard.

Additionally, in some examples, the charging station 450 may also have an indicator unit 1034 that can provide indications of power availability at the charging station. The indicator unit 1034 may provide indications as a light, LED, display, or other indicator unit to provide an indication of power availability. Additionally, in some examples, indications may also provide the cost of power from the charging station 450. Therefore, a vehicle owner may know the cost of power before using the charging station. Further, in some examples, the charging station 450 may also include a payment unit 1038. In some examples, the payment unit 1038 may include a credit card and/or RFID payment system. In additional examples, charging station 450 may have an internet connection through communication unit 1036 and enable payments for power through a mobile application executed on a mobile device. The payment transaction may be completed by the user by way of their mobile device. When a user initiates a payment transaction, a signal may be communicated to the charging station 450 to enable power delivery to the vehicle.

Also shown in FIG. 10B is an example of charging station 450 providing notifications. As previously discussed, the charging station 450 may be configured to provide notifications based on power availability. Notifications may be provided by way of mobile application 1044, email, text, message, etc. to mobile devices 1042 (or vehicles) of users of the charging station 450. The notification may specify that the charging station is operable to charge a vehicle. The notification may also specify a price for electricity from the charging station 450. Conversely, in some examples, the notification may specify that the charging station is no longer operable to charge a vehicle. In yet another example, the notification may specify a change in price for electricity from the charging station 450.

In another example, notifications may be sent based on a charger provider network 1048. In this example, a group of charging stations 450 may form a charging provider network 1048. The charging provider network 1048 of charging stations 450 may be an internet-based network that can provide an end user with a listing of charging stations and whether or not each is presently supplying power. Further, the network may also specify a price of power at each respective charging station 450.

In some examples, the communication unit 1036 of the charging station 450 may wireless communicate 1046 with mobile devices 1042 to provide notifications. The communication unit 1036 of the charging station 450 may also wireless communicate 1052 with the charging provider network 1048 to provide notifications. In yet another example, the mobile device 1042 may wirelessly receive notifications from the charging provider network 1048.

In some further examples, notifications may be sent based on a geo-fenced area 1054 near the charging station 450. For example, notifications may be sent to mobile devices 1042 of vehicle owners within a predetermined area that comprises the geo-fenced area 1054. In some examples, the geo-fenced area 1054 may be based on the range of a wireless network (such as an 802.11-based Wifi network, Bluetooth, or other wireless technology) of the communication unit 1036 of the charging station 450. In another example, the mobile device 1042 of the user may be in communication with a charger provider network 1048. The mobile device 1042 may report its location to the charger provider network 1048 and the charger provider network 1048 may issue alerts based on the position of the mobile device 1042. In another example, the charger provider network 1048 may provide information about charging stations that have power availability. A mobile application 1044 may responsively issue alerts based on the information provided by the charger provider network 1048. The mobile application 1044 may determine if the mobile device 1042 is within a predetermined range (e.g., a geo-fenced area) of a charging station 450 with power availability before alerting the user.

Energy storage unit 1010 is connected to behind-the-meter AC voltage 1020 such that it can store energy from the power generation unit 1002 and/or dispense stored power to the grid 1050 and/or the flexible datacenter 200 and/or the charging station 450. In some embodiments, the energy storage unit 1010 may be configured to charge during predefined time periods, such as during periods when power cost is low from the power generation unit 1002.

The datacenter control system (220 of FIG. 4) of flexible datacenter 200 may be configured to selectively deliver power to the behind-the-meter power input system (210 of FIG. 4) from any of the power generation unit 1002, the energy storage unit 1010, and/or the local station 1080, alone or in combination simultaneously. Alternatively or additionally, the remote master control system (420 of FIG. 5) may be configured to selectively direct power to the behind-the-meter power input system (210 of FIG. 4) from any of the power generation unit 1002, the energy storage unit 1010, and/or the local station 1080, alone or in combination simultaneously. Alternatively or additionally, an energy storage control system (1160 of FIG. 11) may be configured to selectively direct power to the behind-the-meter power input system (210 of FIG. 4) and/or charging station 450 from any of the power generation unit 1002, the energy storage unit 1010, and/or the local station 1080, alone or in combination simultaneously. Additionally, the energy control system (1160 of FIG. 11) may be configured to selectively direct power to the grid 1050 from the energy storage unit 1010. In any case, power from the power generation unit 1002 and energy storage unit 1010 are considered behind-the-meter and power from local station 1080 is considered grid power (i.e., metered power).

Figure 11:
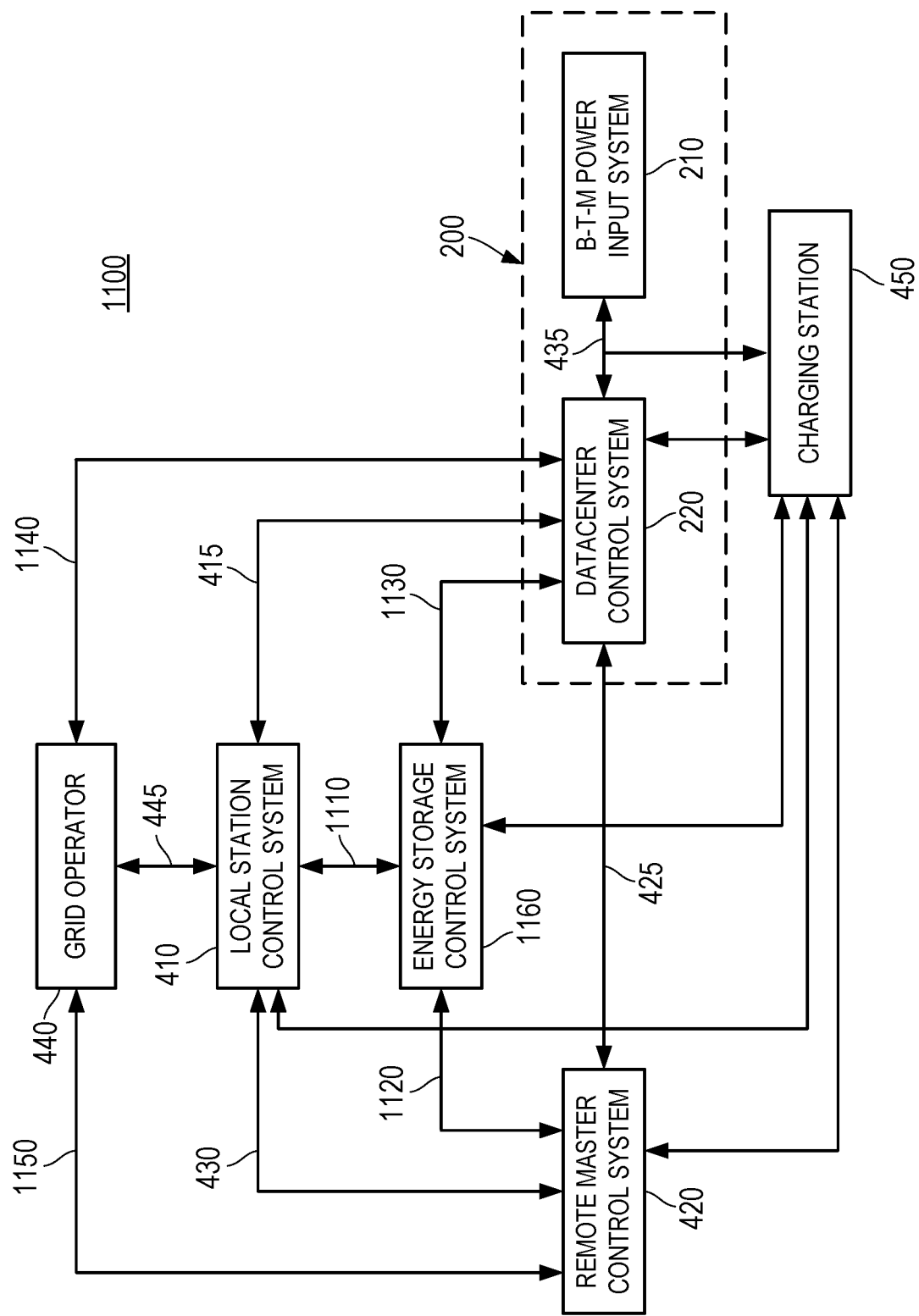
FIG. 11 shows a control distribution scheme with a flexible datacenter and energy storage unit in accordance with one or more embodiments of the present invention.

FIG. 11 shows a control distribution scheme with a flexible datacenter and energy storage unit in accordance with one or more embodiments of the present invention. The control distribution scheme 1100 is similar to the scheme illustrated in FIG. 4, with the addition of energy storage control system 1160 and additional communication connections 1120, 1130, 1140, and 1150. Components and aspects illustrated and/or described in FIG. 11 that are similar or the same as components or aspects illustrated and/or described in FIG. 4 should be considered to have the same characteristics as previously illustrated and/or described.

As illustrated in FIG. 11, and previously described with respect to FIG. 4, datacenter control system 220 may operate independently, or cooperatively with one or more of local station control system 410, remote master control system 420, and grid operator 440, to modulate power delivery to flexible datacenter 200 and the charging station 450. Specifically, power delivery may be dynamically adjusted based on conditions or operational directives.

Energy storage control system 1160 may communicate with datacenter control system 220, remote master control system 420, and/or local station control system 410 over respective networked or hardwired connections 1130, 1120, and 1110. In some further examples, the energy storage control system 1160 may communicate with the charging station 450 (connection not shown).

In one embodiment, datacenter control system 220 may independently, or cooperatively with one or more of local station control system 410, remote master control system 420, and energy storage control system 1160, modulate power delivery to flexible datacenter 200 and/or charging station 450. Specifically, datacenter control system 220 may selectively direct power delivery to the behind-the-meter power input system (210 from FIG. 4) from: (i) the power generation unit 1002 alone, (ii) the energy storage unit alone 1010, or (iii) both the power generation unit 1002 and the energy storage unit 1010 simultaneously. In another embodiment, datacenter control system 220 may selectively direct power delivery to the behind-the-meter power input system (210 from FIG. 4) from: (i) the power generation unit 1002 alone, (ii) the energy storage unit 1010 alone, (iii) the local station 1080 alone, or (iv) a simultaneous combination of at least two of those sources. In any or all cases, the datacenter control system 220 may act through the other identified control systems by issuing directives that instruct the control systems to direct power accordingly.

In another embodiment, the remote master control system 420 may independently, or cooperatively with one or more of local station control system 410, datacenter control system 220, and energy storage control system 1160, modulate power delivery to flexible datacenter 200 and/or charging station 450. Specifically, remote master control system 420 may selectively direct power delivery to the behind-the-meter power input system (210 from FIG. 4) from: (i) the power generation unit 1002 alone, (ii) the energy storage unit alone 1010, or (iii) both the power generation unit 1002 and the energy storage unit 1010 simultaneously. In another embodiment, remote master control system 420 may selectively direct power delivery to the behind-the-meter power input system (210 from FIG. 4) from: (i) the power generation unit 1002 alone, (ii) the energy storage unit 1010 alone, (iii) the local station 1080 alone, or (iv) a simultaneous combination of at least two of those sources. In any or all cases, the remote master control system 420 may act through the other identified control systems by issuing directives that instruct the control systems to direct power accordingly.

In another embodiment, the energy storage control system 1160 may independently, or cooperatively with one or more of local station control system 410, datacenter control system 220, and remote master control system 420, modulate power delivery to flexible datacenter 200 and/or charging station 450. Specifically, energy storage control system 1160 may selectively direct power delivery to the behind-the-meter power input system from: (i) the power generation unit 1002 alone, (ii) the energy storage unit alone 1010, or (iii) both the power generation unit 1002 and the energy storage unit 1010 simultaneously. In another embodiment, energy storage control system 1160 may selectively direct power delivery to the behind-the-meter power input system (210 from FIG. 4) from: (i) the power generation unit 1002 alone, (ii) the energy storage unit 1010 alone, (iii) the local station 1080 alone, or (iv) a simultaneous combination of at least two of those sources. In any or all cases, the energy storage control system 1160 may act through the other identified control systems by issuing directives that instruct the control systems to direct power accordingly.

In another embodiment, energy storage control system 1160 may selectively enable delivery of power from the power generation unit 1002 to the energy storage unit 1010, and (ii) selectively enable delivery of power from the energy storage unit 1010 to the flexible datacenter 200 and/or charging station 450. Additionally, energy storage control system 1160 may selectively enable delivery of power from the energy storage unit 1010 to the electrical grid 1050.

In some embodiments, additional network or hardwired communication connections 1140 and 1150 may be present to enable direct communication between the grid operator 440 and the datacenter control system 220 and remote master control system 420, respectively. This provides additional direct communication connections for command and control functions, as well as for communicating information regarding monitored power system conditions. Alternatively, information and directives may still be passed between control systems indirectly. For example, the grid operator 440 may send a signal to the remote master control system 420 via the local station control system 410.

In various embodiments, the operational directives and/or power system conditions may be passed between and among the control systems, such as energy storage control system 1160, local station control system 410, datacenter control system 220, and remote master control system 420. The operational directives and/or power system conditions may also be passed between and among the grid operator 440 and the local station control system 410, datacenter control system 220, and remote master control system 420. Operational directives may include, but are not limited to, a local station directive, a remote master control directive, a grid directive, a dispatchability directive, a forecast directive, a workload directive based on actual behind-the-meter power availability or projected behind-the-meter power availability. Power system conditions, which may be monitored by one or more of the control systems 220, 420, 410, and/or 1160 may include, but are not limited to, excess local power generation at a local station level, excess local power generation that a grid cannot receive, local power generation subject to economic curtailment, local power generation subject to reliability curtailment, local power generation subject to power factor correction, low local power generation, start up local power generation situations, transient local power generation situations, or testing local power generation situations where there is an economic advantage to using local behind-the-meter power generation.

Figure 12:
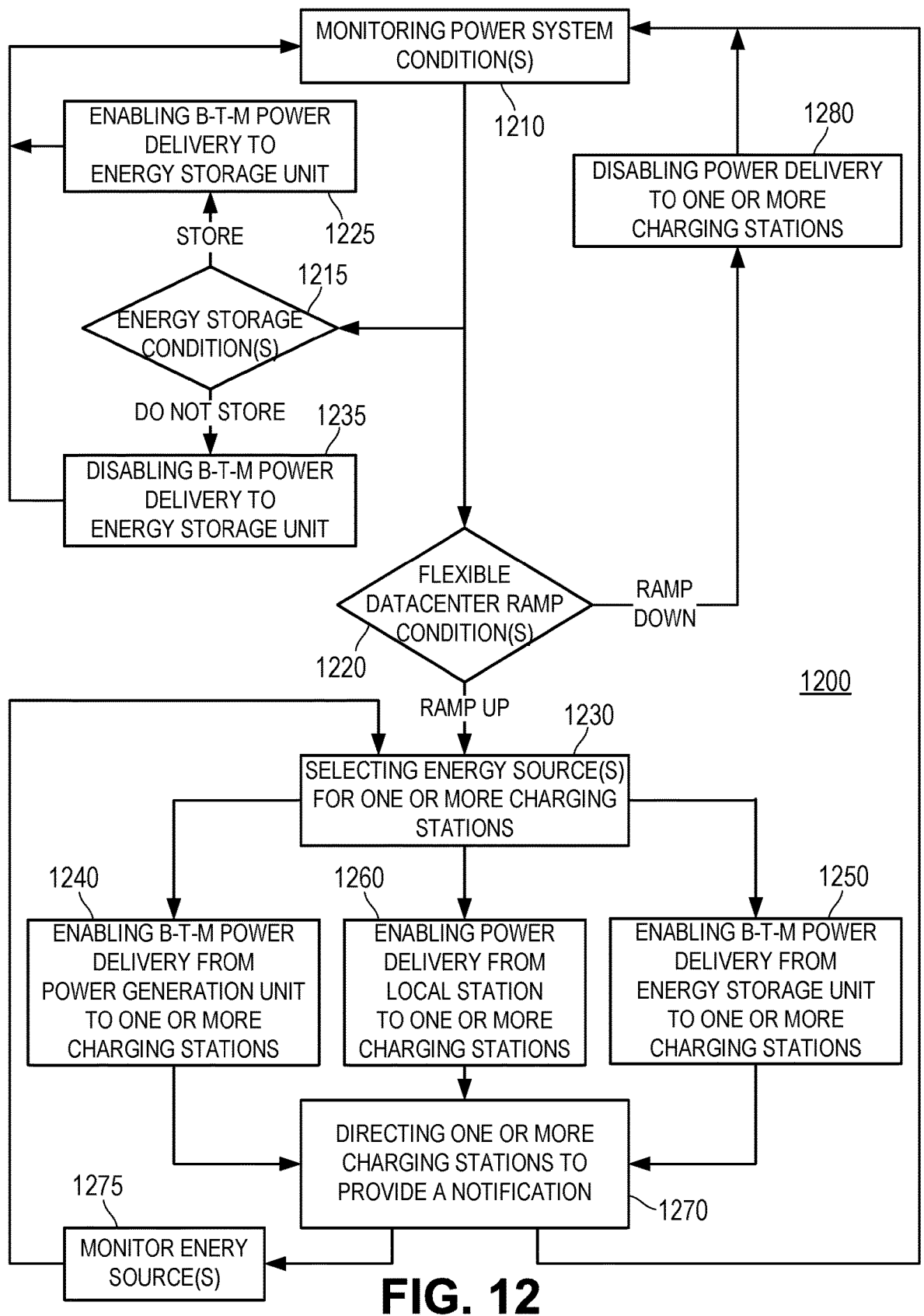
FIG. 12 shows a method of dynamic power delivery to a flexible datacenter using behind-the-meter power in accordance with one or more embodiments of the present invention.

FIG. 12 shows a method of dynamic power delivery to a charging station using behind-the-meter power in accordance with one or more embodiments of the present invention. The charging station may be physically connected to the flexible datacenter in some examples. In other examples, the charging station may have a remote location from the flexible datacenter. In some examples, the power availability at the charging station may be controlled based on the dynamic power delivery to the flexible datacenter. At step 1210, one or more control systems, such as energy storage control system 1160, local station control system 410, datacenter control system 220, and/or remote master control system 420 may monitor one or more power system conditions, such as those described above. Information regarding the power system conditions may be available from, requested from, or sent from the control systems 220, 420, 410, and/or 1160, the grid operator 440, or from other sources such as sensors or market place information services. Additionally, one more of the control systems 220, 420, 410, and/or 1160 may determine one or more power system conditions by aggregating information and/or calculating, determining, inferring, or predicting a power system condition.

At step 1220, one or more control systems 220, 420, 410, and/or 1160 may determine, based on one more monitored power system conditions and/or an operational directive from another control system 220, 420, 410, and/or 1160 or the grid operator 440 that a flexible datacenter ramp condition exists. This may be a ramp-up condition which would result in increased power utilization by the datacenter 200 or a ramp-down condition which would result in decreased power utilization by the datacenter 200. Additionally, the ramp-up condition may cause power to be supplied to the charging station 450 so that it may supply power for charging services, whereas the ramp-down condition may stop power supply to the charging station 450 and therefore effectively stop the availability of charging services.

In a ramp-up condition, one or more of the control systems 220, 420, 410, and/or 1160 will act independently or in conjunction with another of the control systems 220, 420, 410, and/or 1160 to select one or more energy sources, such as power generation unit 1002, energy storage unit 1010, or local station 1080, to supply power or additional power to the charging station 450 and/or also computing systems 100 of flexible datacenter 200. The selection may be based on, but is not limited to, power availability at one or more of the energy sources, economic indicators, one or more operational directives, and/or power system conditions. Energy selected from power generation unit 1002 or energy storage unit 1010 is considered behind-the-meter power and energy selected from local station 1080 is considered grid (i.e., metered) power. As previously described, selecting behind-the-meter power is preferable to selecting grid power due to the reduced cost associated with the power and/or other factors such as the ability to accomplish power factor correction and to reduce grid congestion.

After selecting one or more energy sources 1230, one or more of the control systems 220, 420, 410, and/or 1160 will act independently or in conjunction with another of the control systems 220, 420, 410, and/or 1160 to direct power from the energy source(s) to the one or more charging stations 450, as illustrated in steps 1240, 1250, and/or 1260. Preferably control systems 220 and/or 420, but potentially control systems 1160 and/or 410, will then direct one or more of the charging stations 450 of flexible datacenter 200 to provide a notification, as illustrated in step 1270.

One or more of the control systems 220, 420, 410, and/or 1160 may then act independently or in conjunction with another of the control systems 220, 420, 410, and/or 1160 to intermittently, periodically, or continuously monitor the energy sources at step 1275. In response to information obtained during the monitoring or an operational directive, one or more of the control systems 220, 420, 410, and/or 1160 may act independently or in conjunction with another of the control systems 220, 420, 410, and/or 1160 to select a new energy source or combination of energy sources as the charging stations 450 continue to provide charging services.

As one example, the energy storage control system 1160 may select the energy storage unit 1010 for power supply and the datacenter control system 220 alone or in conjunction with the energy storage control system 1160 may enable and direct behind-the-meter power from the energy storage unit 1010 to the behind-the-meter power input system 210, where the power will be delivered to the charging stations 450. When the energy storage unit 1010 becomes depleted, the energy storage control system 1160, alone or in conjunction with the datacenter control system 220 may switch to power delivery from the power generation unit 1002 or the local station 1080. Other combinations are possible as well.

Concurrently with any monitoring of energy sources, one more of the control systems 220, 420, 410, and/or 1160 may continue to monitor power system conditions at 1210. Looking again at step 1220, one or more control systems 220, 420, 410, and/or 1160 may determine, based on one more monitored power system conditions and/or an operational directive from another control system 220, 420, 410, and/or 1160 or the grid operator 440 that a flexible datacenter ramp-down condition exists. In the ramp-down condition, at step 1280 one or more of the control systems 220, 420, 410, and/or 1160 will act independently or in conjunction with another of the control systems 220, 420, 410, and/or 1160 to direct one or more of the charging stations 450 to stop charging operations, or alternatively to reduce the power available for charging operations. At step 1290, one or more of the control systems 220, 420, 410, and/or 1160 may then act independently or in conjunction with another of the control systems 220, 420, 410, and/or 1160 to disable power delivery from the one or more energy sources to the one or more charging stations 450.

Concurrently with, or in between, other steps of the method, one or more of the control systems 220, 420, 410, and/or 1160 may act independently or in conjunction with another of the control systems 220, 420, 410, and/or 1160 to determine an energy storage condition at step 1215. The energy storage condition may be based on the power availability from the power generation unit 1002, the energy level in the energy storage unit 1010, power system conditions, and operational directive, or any combination of the foregoing. The energy storage control system 1160, alone or in conjunction with other control systems 220, 420, 410 may determine that behind-the-meter power from the power generation unit 1002 should be stored or not stored in the energy storage unit 1010. The energy storage control system 1160, alone or in conjunction with other control systems 220, 420, 410 may then enable or disable behind-the-meter power delivery to the energy storage unit at steps 1225 or 1235, as appropriate.

Figure 13:
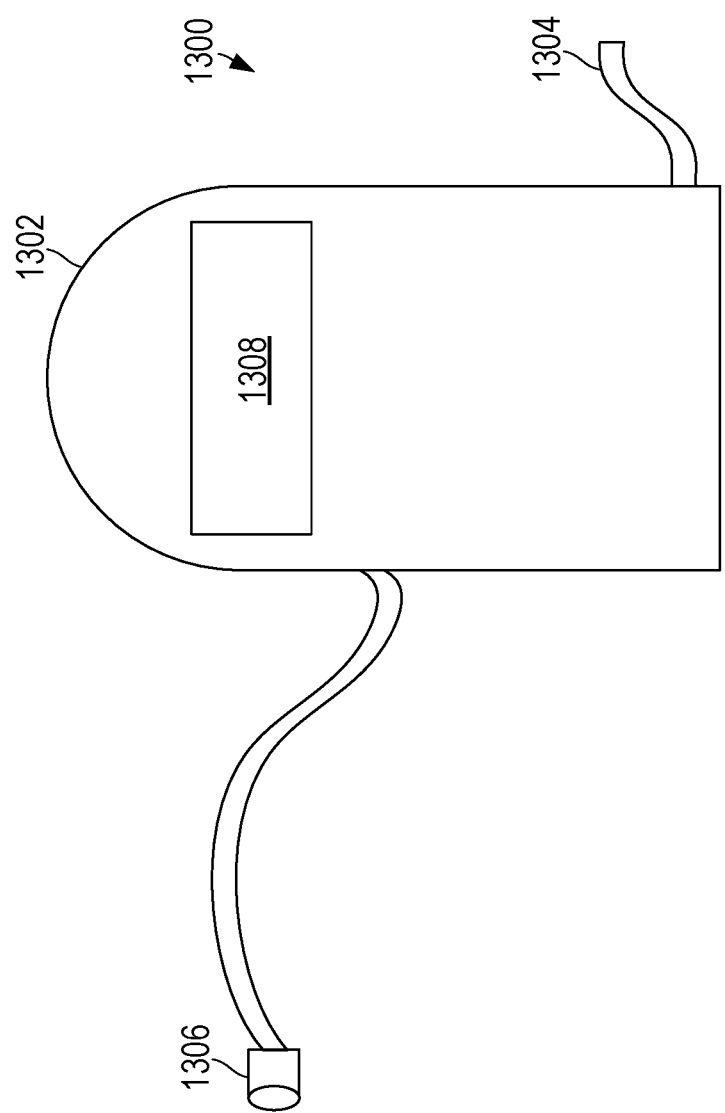
FIG. 13 shows an example charging station, for use with the present disclosure.

FIG. 13 shows an example charging station 1300, for use with the present disclosure. In some examples, the charging station 1300 may be the same, or used as, as charging station 450. Charging station 1300 may include a freestanding charging unit 1302. The charging unit 1302 may include a power connection 1304. Additionally, the charging unit 1302 may include a vehicle-charging interface 1306. Further, the charging station 1300 may include an indicator unit 1308. The charging station 1300 may be configured to provide power to vehicles coupled to the charging station in response to the previously-described ramp-up conditions. For example, when there is available behind-the-meter power, the charging station 1300 may be able to supply power from the behind-the-meter source to vehicles.

The charging station 1300 has a power input 1304 and a power distribution system (not shown). The power input 1304 may be coupled to a renewable power source, such as a wind-generated power source, a solar power source, or other renewable power source. As previously discussed, the power sources may be coupled to the power input 1304, while avoiding the conventional power grid system. That is, the power provided to the charging station 1300 at the power input 1304 may not be metered power providing by an electrical grid. The power at power input 1304 may be behind-the-grid power that is not supplied by a conventional electrical utility company. When power is supplied behind-the-grid, the power generated by the renewable source may be supplied directly without any intermediary party to charge vehicles at the power station 1300.

In some examples, the power input 1304 may be coupled directly to a power output of a renewable power source. Thus, in these examples, the power supplied to the power input 1304 may be based on a power availability from the renewable power source. When the renewable power source is not supplying power, or is supplying power below a threshold level, the charging station 1300 may not receive power from the power input 1304. In these situations, the charging station may not be able to supply power to a vehicle until power is available. In other examples, the power input 1304 may be coupled to an energy storage unit, such as a battery (like power storage station 1400 of FIG. 14), that stores power output of a renewable power source. Thus, in examples, where the power input 1304 is coupled to an energy storage unit, the charging station 1300 may be able to supply power even when the renewable energy source is not providing power, as previously generated power is stored by the energy storage unit.

In practice the charging station 1300 may be configured to provide electricity to charge one or more electric vehicles at a given time by way of the vehicle-charging interface 1306. In one example, the vehicle-charging interface 1306 includes at least one charging cable for an electric vehicle and may include a plurality of charging cables so more than one car may be charged at once. In various examples, different standardized charging ports may be used to couple the charging station 1300 to vehicle. In some further examples, the charging station 1300 may be able to supply power to a vehicle wirelessly through the vehicle-charging interface. In wireless charging application, the vehicle-charging interface 1306 may not include a charging cable that connects to the vehicle as shown, but rather the cable may connect to a wireless charging unit, such as an inductive charging unit.

In some examples, the charging station 1300 may also include an indicator unit 1308 that can provide indications of power availability at the charging station. The indicator unit 1308 may provide indications as a light, LED, display, or other indicator unit to provide an indication of power availability. Additionally, in some examples, indications may also provide the cost of power from the charging station 1300. Therefore, a vehicle owner may know the cost of power before using the charging station.

Further, in some examples, the charging station 1308 may also include a payment unit 1310. In some examples, the payment unit (as shown as payment unit 1038 of FIG. 10) may include a credit card and/or RFID payment system. In additional examples, charging station 1300 may have an internet connection through communication unit (as shown as communication unit 1036 of FIG. 10) and enable payments for power through a mobile application executed on a mobile device. The payment transaction may be completed by the user by way of their mobile device. When a user initiates a payment transaction, a signal may be communicated to the charging station 1300 to enable power delivery to the vehicle.

Additionally, as previously discussed with respect to FIG. 4, the charging station 1300 may be configured to provide notifications based on power availability. Notifications may be provided by way of mobile application, email, text, message, etc. to users of the charging station 1300. The notification may specify that the charging station 1300 is operable to charge a vehicle. The notification may also specify a price for electricity from the charging station 1300. Conversely, in some examples, the notification may specify that the charging station is no longer operable to charge a vehicle. In yet another example, the notification may specify a change in price for electricity from the charging station 1300. In some further examples, notifications may be sent based on a geo-fenced area near the charging station 1300. For example, notifications may be sent to mobile devices of vehicle owners within a predetermined area.

In another example, notifications may be sent based on a charger provider network. In this example, a group of charging stations 1300 may form a charging provider network. The network of charging stations 1300 may provide an end user with a listing of charging stations and whether or not each is presently supplying power. Further, the network may also specify a price of power at each respective charging station. In some examples, the network may be part of an operational fleet. The fleet may receive notifications of power availability.

For example, a fleet of electric vehicles may include trucks, cars, planes, helicopters, etc. The notifications may be used to route vehicles to charging stations that currently have power available. In some other examples, the network of charging stations may have a network controller. The network controller may be able to issue notifications on an assumption of power availability. For example, the network controller may be able to monitor weather and know when sun or wind will cause power to be available at a given charging station. In response, the network controller may be able to direct vehicles to the charging station that will have power available.

Figure 14:
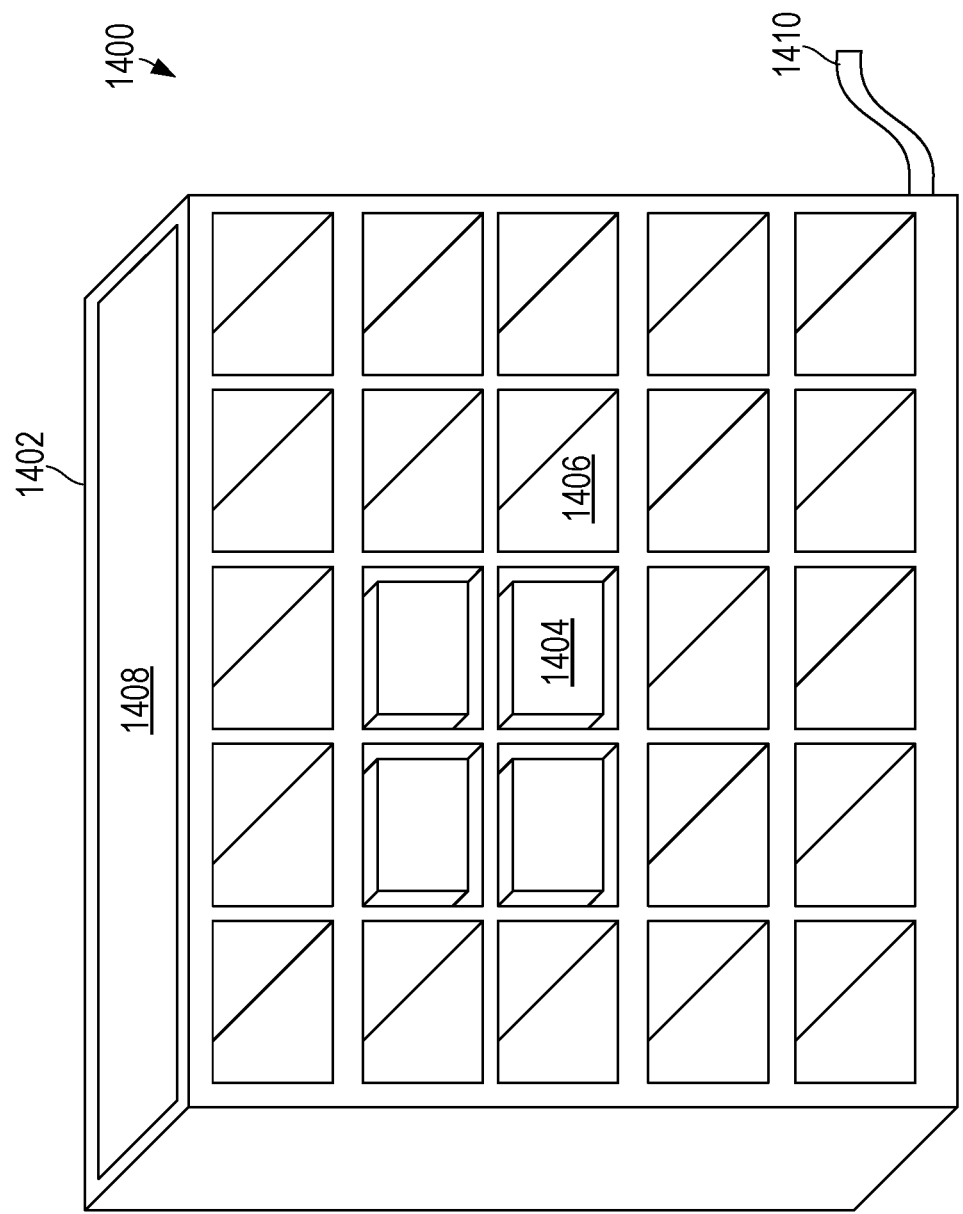
FIG. 14 shows an example power storage station, for use with the present disclosure.

FIG. 14 shows an example power storage station 1400, for use with the present disclosure. The power storage station 1400 may include a battery charging unit 1402. The battery charging unit 1402 may be configured to house one or more batteries 1404 in one or more battery compartments 1406. Additionally, the power storage station 1400 may have its own renewable power unit 1408. The power storage station 1400 may be coupled to a renewable energy source, as described with respect to FIG. 13, by way of the power input 1410. The power storage station 1400 may be configured to provide power to a charging station 1300 and/or a plurality of batteries in response to the previously-described ramp-up conditions. For example, when there is available behind-the-meter power, the power storage station 1400 may be able to supply power to a charging station 1300 and/or charge batteries of the power storage station 1400.

The power storage station 1400 may be configured to store power provided by the power input 1410 and/or power generated by the renewable power source 1408 in batteries 1404. The power station 1400 may act as a power repository for one or more charging stations, such as charging station 1300 of FIG. 13. By charging the batteries 1404, power generated from a renewable source may be stored for later use, such as at a time when the renewable power source cannot generate power (e.g., when there is little wind or no sun). Thus, the power storage station 1400 may act as a large power bank (i.e., large battery) to store energy produced from the renewable power source.

The power input 1410 may be coupled to a renewable power source, such as a wind-generated power source, a solar power source, or other renewable power source. As previously discussed, the power sources may be coupled to the power input 1410, while avoiding the conventional power grid system. That is, the power provided to the power storage station 1400 at the power input 1410 may not be metered power providing by an electrical grid. The power at power input 1410 may be behind-the-grid power that is not supplied by a conventional electrical utility company. When power is supplied behind-the-grid, the power generated by the renewable source may be supplied directly without any intermediary party to charge vehicles at the power storage station 1400.

In some examples, the power input 1410 may be coupled directly to a power output of a renewable power source. Thus, in these examples, the power supplied to the power input 1410 may be based on a power availability from the renewable power source. When the renewable power source is not supplying power, or is supplying power below a threshold level, the power storage station 1400 may not receive power from the power input 1410. In these situations, the power storage station 1400 may use its own renewable power source 1408 to charge the batteries 1404.

In some examples, the batteries 1404 may be of the same size and shape as those used to power electric vehicles. The batteries 1404 may be removable from the battery compartments 1406 of the power storage station 1400 and used to replace the battery of an electric vehicle. Thus, the power storage station 1400 may enable hot-swapping of electric vehicle batteries. The power storage station 1400 may also be in communication with the notification network described with respect to FIG. 13. When the power storage station 1400 is in communication with the notification network, the charge status and/or price for batteries may be provided to users of the network. Further, the network may also provide routing instructions for electric vehicles that need a replacement battery to the power storage station 1400.

Figure 15:
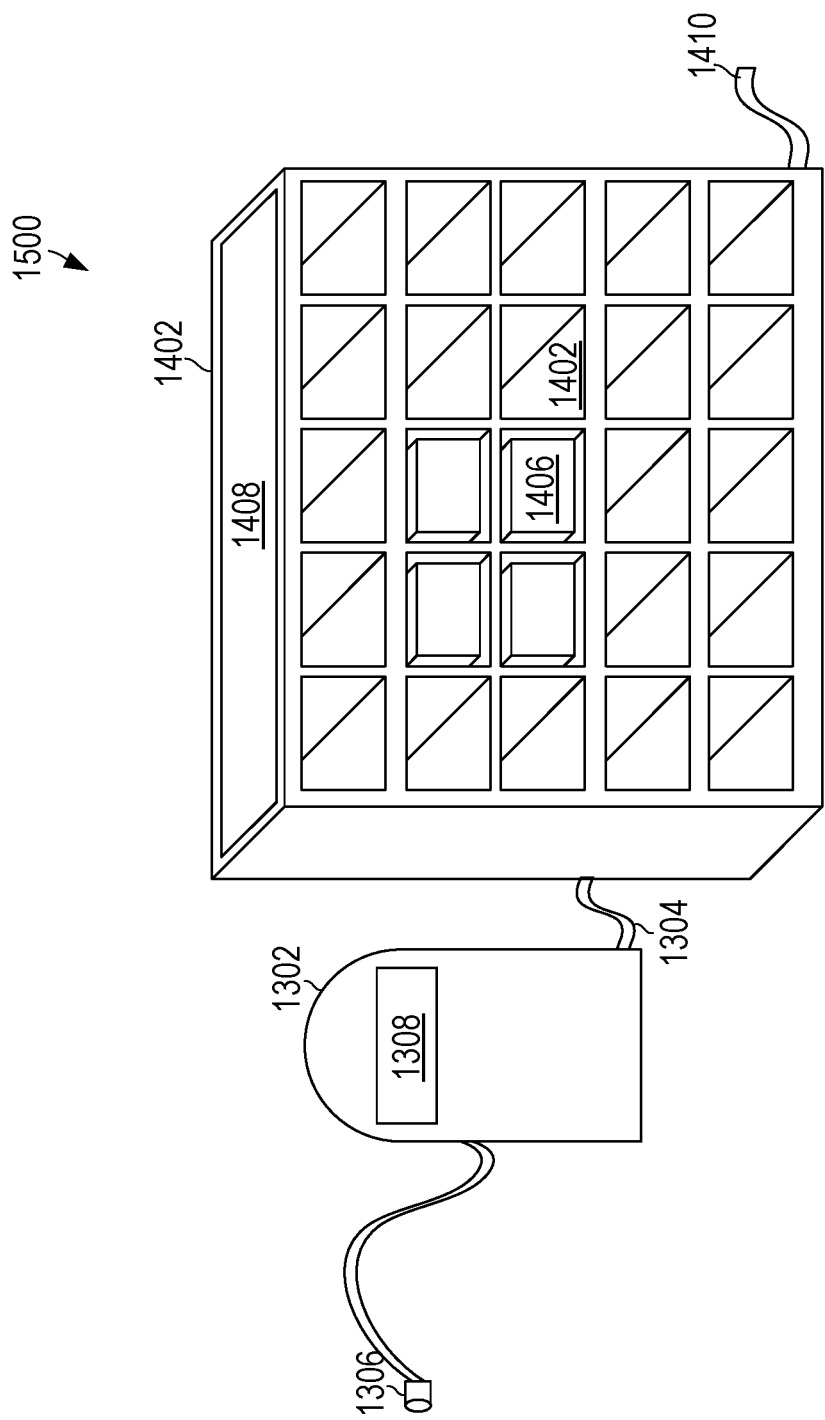
FIG. 15 an example charging station and an example power storage station, for use with the present disclosure.

FIG. 15 an example charging station and an example power storage station 1500, for use with the present disclosure. As shown in FIG. 15, a charging unit 1302 may be coupled to a battery charging unit 1402. Thus, the charging unit 1302 may be able to supply power to vehicles that are stored in the batteries 1404 of the battery charging unit 1402.

Advantages of one or more embodiments of the present invention may include one or more of the following:

One or more embodiments of the present invention provides a green solution to a prominent problem, the unutilized and typically wasted energy generated from renewable energy sources.

One or more embodiments of the present invention allows for the rapid deployment of mobile datacenters to local stations. The mobile datacenters may be deployed on site, near the source of power generation, and receive unutilized behind-the-meter power when it is available.

One or more embodiments of the present invention allows for the power delivery to the datacenter to be modulated based on conditions or an operational directive received from the local station or the grid operator.

One or more embodiments of the present invention may dynamically adjust power consumption by ramping-up, ramping-down, or adjusting the power consumption of one or more charging stations within or controlled by the flexible datacenter.

One or more embodiments of the present invention may be powered by behind-the-meter power that is free from transmission and distribution costs. As such, the charging station of the flexible datacenter may perform charging operations, with little to no energy cost.

One or more embodiments of the present invention provides a number of benefits to the hosting local station. The local station may use the flexible datacenter to adjust a load, provide a power factor correction, to offload power, or operate in a manner that invokes a production tax credit and/or generates incremental revenue.

One or more embodiments of the present invention allows for continued shunting of behind-the-meter power into a storage solution when a flexible datacenter cannot fully utilize excess generated behind-the-meter power.

One or more embodiments of the present invention allows for continued use of stored behind-the-meter power when a flexible datacenter can be operational but there is not an excess of generated behind-the-meter power.

It will also be recognized by the skilled worker that, in addition to improved efficiencies in controlling power delivery from intermittent generation sources, such as wind farms and solar panel arrays, to regulated power grids, the invention provides more economically efficient control and stability of such power grids in the implementation of the technical features as set forth herein.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should be limited only by the appended claims.

What is claimed is:

1. A system comprising:
    a behind-the-meter vehicle charging station comprising:
        a vehicle-charging interface configured to supply vehicle-charging power from a power generation system prior to the power undergoing step-up transformation for transmission to a grid to a vehicle; and
        a communication unit configured to trigger a notification in response to a change in power availability; and
    a control system configured to modulate power delivery to the behind-the-meter charging station based on one or more monitored power system conditions or an operational directive.

2. The system of claim 1, wherein the communication unit is further configured to trigger the notification to a charger provider network.

3. The system of claim 1, wherein the communication unit is further configured to trigger the notification to mobile devices.

4. The system of claim 1, wherein the communication unit is further configured to trigger the notification based on a geo-fenced region.

5. The system of claim 1, wherein the operational directive comprises one or more of a local station directive, a remote master control directive, or a grid directive.

6. The system of claim 1, wherein the operational directive comprises one or more of a dispatchability directive, a forecast directive, or a workload directive, each based on actual behind-the-meter power availability or projected behind-the-meter power availability.

7. The system of claim 1, wherein monitored power system conditions comprises one or more of excess local power generation at a local station level, excess local power generation that a grid cannot receive, local power generation subject to economic curtailment, local power generation subject to reliability curtailment, local power generation subject to power factor correction, low local power generation, start up local power generation situations, transient local power generation situations, testing local power generation situations, or where there is an economic advantage to using local behind-the-meter power generation.

8. The system of claim 1, further comprising a remote master control system, wherein the remote master control system is configured to selectively direct power delivery to the behind-the-meter power input system from: (i) the power generation unit alone, (ii) the energy storage unit alone, or (iii) both the power generation unit and the energy storage unit simultaneously.

9. The system of claim 5, further comprising a remote master control system, wherein the remote master control system is configured to selectively direct power delivery to the behind-the-meter power input system from: (i) the power generation unit alone, (ii) the energy storage unit alone, (iii) the local station alone, or (iv) a simultaneous combination of at least two sources selected from a group comprising the power generation unit, the energy storage unit, and the local station.

10. The system of claim 1, further comprising an energy storage control system configured to: (i) selectively enable delivery of power from a power generation unit to an energy storage unit, and (ii) selectively enable delivery of power from the energy storage unit to charging station.

11. A method comprising:
determining that a flexible datacenter ramp-up condition is met; and
based on the determination that the flexible datacenter ramp-up condition is met:
(a) enabling behind-the-meter power delivery from one or more selected behind-the-meter energy sources receiving power from a power generation system prior to step-up transformation for transmission to a grid to the one or more vehicle charging stations, and
(b) triggering a notification from a communication unit of the one or more vehicle charging stations.

12. The method of claim 11, wherein triggering a notification from a communication unit further configured to trigger the notification to a charger provider network.

13. The method of claim 11, wherein triggering a notification from a communication unit further configured to trigger the notification to mobile devices.

14. The method of claim 11, wherein triggering a notification from a communication unit further configured to trigger the notification based on a geo-fenced region.

15. The method of claim 11, further comprising:
determining an energy storage condition; and
based on the determined energy storage condition either:
(i) enabling behind-the-meter power delivery from a power generation unit to an energy storage unit, or (ii) disabling behind-the-meter power delivery from the power generation unit to the energy storage unit.

16. The method of claim 11, wherein determining that a flexible datacenter ramp-up condition is met comprises:
monitoring an amount of available behind-the-meter power; and
determining that the amount of available behind-the-meter power is above a threshold value.

17. The method of claim 11, wherein determining that a flexible datacenter ramp-up condition is met comprises:
monitoring for a power generation curtailment signal; and
determining that power generation curtailment signal has been received.

18. The method of claim 11, wherein determining that a flexible datacenter ramp-up condition is met comprises:
monitoring a power factor of local power generation; and
determining that the power factor is below a threshold value.

19. The method of claim 11, wherein determining that a flexible datacenter ramp-up condition is met comprises one of:
receiving an operational directive directing the flexible datacenter to ramp-up; and
determining that no operational directive has been received directing the flexible datacenter to not ramp-up.

20. The method of claim 11, further comprising:
determining that a datacenter ramp-down condition is met; and
based on the determination that the datacenter ramp-down condition is met:
(a) directing the one or more charging stations to stop providing charging services, and
(b) disabling behind-the-meter power delivery from the one or more behind-the-meter energy sources to the one or more charging stations.

* * * * *